United States Patent
Dhagat et al.

(10) Patent No.: US 11,242,948 B2
(45) Date of Patent: Feb. 8, 2022

(54) POTTED PIPE FITTING SYSTEMS AND METHODS

(71) Applicant: TRINITY BAY EQUIPMENT HOLDINGS, LLC, Houston, TX (US)

(72) Inventors: Alok Dhagat, Katy, TX (US); Nader Matari, Houston, TX (US); Christopher Grover Scoggins, Katy, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 16/953,576

(22) Filed: Nov. 20, 2020

(65) Prior Publication Data
US 2021/0172548 A1 Jun. 10, 2021

Related U.S. Application Data

(60) Provisional application No. 62/939,386, filed on Nov. 22, 2019.

(51) Int. Cl.
*F16L 33/01* (2006.01)
*F16L 13/11* (2006.01)
(Continued)

(52) U.S. Cl.
CPC .............. *F16L 33/01* (2013.01); *F16L 13/10* (2013.01); *F16L 13/116* (2013.01); *F16L 21/08* (2013.01)

(58) Field of Classification Search
CPC . F16L 13/10; F16L 13/11; F16L 33/01; F16L 33/28; F16L 11/083
(Continued)

(56) References Cited

U.S. PATENT DOCUMENTS 4,783,980 A 11/1988 Varga
6,019,137 A 2/2000 Secher et al.
(Continued)

FOREIGN PATENT DOCUMENTS

AU 2014299014 1/2019
AU 2014363465 1/2019
(Continued)

OTHER PUBLICATIONS

Campello, George et al.; A Novel Concept of Flexible Pipe End Fitting: Tensile Armor Foldless Assembly; Proceedings of the ASME 2012 31st International Conference on Ocean, Offshore and Arctic Engineering; Jul. 1-6, 2012; Brazil.
(Continued)

*Primary Examiner* — Zachary T Dragicevich
(74) *Attorney, Agent, or Firm* — Conrad J. Hsu

(57) ABSTRACT

Techniques for implementing a pipeline system including a pipe segment and a potted pipe fitting. The pipe segment includes tubing having an internal pressure sheath layer, a reinforcement strip, and an outer sheath layer. The potted pipe fitting includes an outer fitting body disposed around a portion of the reinforcement strip, an inner fitting body disposed between the portion of the reinforcement strip and the internal pressure sheath layer, in which the inner fitting body directly abuts the internal pressure sheath layer at least up to a point where the reinforcement strip begins to flare away from the internal pressure sheath layer and a potting cavity of the potted pipe fitting is defined at least between an inner surface of the outer fitting body and an outer surface of the inner fitting body, and cured potting material implemented around the portion of the reinforcement strip in the potting cavity.

16 Claims, 5 Drawing Sheets

(51) Int. Cl.
  *F16L 13/10* (2006.01)
  *F16L 21/08* (2006.01)

(58) Field of Classification Search
  USPC .......... 285/222.1, 222.2, 222.3, 222.4, 222.5
  See application file for complete search history.

(56) References Cited

U.S. PATENT DOCUMENTS

| | | | |
|---|---|---|---|
| 6,161,880 | A | 12/2000 | Peppel |
| 6,273,142 | B1 | 8/2001 | Braad |
| 6,360,781 | B1 | 3/2002 | Braad |
| 6,412,825 | B1 | 7/2002 | Langkjaer |
| 6,592,153 | B1 | 7/2003 | Belcher |
| 6,827,375 | B2 | 12/2004 | Fraser |
| 6,889,715 | B2 | 5/2005 | Fraser et al. |
| 6,904,939 | B2 | 6/2005 | Jung et al. |
| 6,923,477 | B2 | 8/2005 | Buon et al. |
| 7,055,551 | B2 | 6/2006 | Fraser et al. |
| 7,175,208 | B2 | 2/2007 | Belcher |
| 7,204,524 | B2 | 4/2007 | Eccleston |
| 8,104,797 | B2 | 1/2012 | Eccleston et al. |
| 8,112,863 | B2 | 2/2012 | Eccleston et al. |
| 8,220,129 | B2 | 7/2012 | Eccleston et al. |
| 9,217,526 | B2 | 12/2015 | Eccleston |
| 9,303,463 | B2 | 4/2016 | Glejbol et al. |
| 9,395,023 | B2 | 7/2016 | Graham et al. |
| 9,534,719 | B2 | 1/2017 | Eccleston et al. |
| 9,574,690 | B2 | 2/2017 | Clevelario et al. |
| 9,618,419 | B2 | 4/2017 | Demanze et al. |
| 9,643,226 | B2 | 5/2017 | Thompson et al. |
| 9,921,127 | B2 | 3/2018 | Clevelario et al. |
| 9,962,750 | B2 | 5/2018 | Thompson et al. |
| 9,976,681 | B2 | 5/2018 | Karabelas et al. |
| 10,113,677 | B2 | 10/2018 | Bourget et al. |
| 10,190,722 | B2 | 1/2019 | Espinasse et al. |
| 10,197,198 | B2 | 2/2019 | Glejbol |
| 10,226,823 | B2 | 3/2019 | Karpachevskyy |
| 10,226,892 | B2 | 3/2019 | Kremers |
| 10,234,068 | B2 | 3/2019 | Varagnolo et al. |
| 10,281,065 | B2 | 5/2019 | Secher et al. |
| 10,285,223 | B2 | 5/2019 | Hatton et al. |
| 10,288,207 | B2 | 5/2019 | Littlestar et al. |
| 10,364,925 | B2 | 7/2019 | Roberts et al. |
| 10,378,682 | B2 | 8/2019 | Cloos et al. |
| 10,408,795 | B2 | 9/2019 | Nicolas et al. |
| 10,415,731 | B2 | 9/2019 | Boche et al. |
| 10,429,267 | B2 | 10/2019 | Grimsley |
| 10,436,667 | B2 | 10/2019 | Littlestar et al. |
| 10,442,925 | B2 | 10/2019 | Rong et al. |
| 10,451,206 | B2 | 10/2019 | Espinasse et al. |
| 10,471,661 | B2 | 11/2019 | Boczkowski et al. |
| 10,480,054 | B2 | 11/2019 | Valdez et al. |
| 10,487,965 | B2 | 11/2019 | Bouey et al. |
| 10,494,519 | B2 | 12/2019 | Wilson et al. |
| 10,513,896 | B2 | 12/2019 | Gudme et al. |
| 10,527,198 | B2 | 1/2020 | Nicolson et al. |
| 10,544,889 | B2 | 1/2020 | Bouey et al. |
| 10,544,892 | B2 | 1/2020 | Holst |
| 2008/0149209 | A1 | 6/2008 | Felix-Henry |
| 2009/0160184 | A1* | 6/2009 | Vo .................. F16L 33/01 |
| 2010/0011556 | A1 | 1/2010 | Eccleston et al. |
| 2011/0229271 | A1* | 9/2011 | Clements ........... F16L 33/01 |
| 2012/0211975 | A1 | 8/2012 | Campello et al. |
| 2014/0124076 | A1* | 5/2014 | Roberts ............ F16L 33/01 |
| 2014/0312612 | A1 | 10/2014 | Dhagat et al. |
| 2015/0275586 | A1 | 10/2015 | Glejbol et al. |
| 2016/0053928 | A1 | 2/2016 | Roberts et al. |
| 2016/0069494 | A1 | 3/2016 | Paulo et al. |
| 2016/0153598 | A1* | 6/2016 | Bertoni ............ F16L 33/01 |
| 2016/0178106 | A1 | 6/2016 | Glejbol |
| 2016/0208969 | A1 | 7/2016 | Bertoni et al. |
| 2016/0290539 | A1 | 10/2016 | Nielsen |
| 2018/0128404 | A1 | 5/2018 | Gray et al. |
| 2018/0231149 | A1 | 8/2018 | Glejbol et al. |
| 2018/0231150 | A1 | 8/2018 | Glejbol et al. |
| 2018/0231151 | A1 | 8/2018 | Straarup |
| 2018/0231163 | A1 | 8/2018 | Holst et al. |
| 2018/0245725 | A1 | 8/2018 | Glejbol et al. |
| 2018/0283588 | A1 | 10/2018 | Gray et al. |
| 2019/0003921 | A1 | 1/2019 | Nicolas |
| 2019/0024830 | A1 | 1/2019 | Glejbol |
| 2019/0094101 | A1 | 3/2019 | Spiegel et al. |
| 2019/0101233 | A1 | 4/2019 | Hatton et al. |
| 2019/0126567 | A1 | 5/2019 | Bornemann et al. |
| 2019/0154186 | A1 | 5/2019 | Varagnolo et al. |
| 2019/0162334 | A1 | 5/2019 | Westhoff et al. |
| 2019/0162335 | A1 | 5/2019 | Yu et al. |
| 2019/0162336 | A1 | 5/2019 | Andersen et al. |
| 2019/0186656 | A1 | 6/2019 | Kozak et al. |
| 2019/0194440 | A1 | 6/2019 | Rong et al. |
| 2019/0211951 | A1 | 7/2019 | Clements |
| 2019/0217337 | A1 | 7/2019 | Gujare et al. |
| 2019/0219199 | A1 | 7/2019 | Snowdon et al. |
| 2019/0219473 | A1 | 7/2019 | Littlestar et al. |
| 2019/0242501 | A1 | 8/2019 | Bereczkne et al. |
| 2019/0257448 | A1 | 8/2019 | Chalmers et al. |
| 2019/0285199 | A1 | 9/2019 | Nicolson et al. |
| 2019/0309582 | A1 | 10/2019 | Procida |
| 2019/0316711 | A1 | 10/2019 | Shippen et al. |
| 2019/0338868 | A1 | 11/2019 | Hjorth |
| 2019/0368967 | A1 | 12/2019 | Grimsley |
| 2019/0391097 | A1 | 12/2019 | Nicolas et al. |
| 2020/0011467 | A1 | 1/2020 | Holst |
| 2020/0049280 | A1 | 2/2020 | Wang et al. |
| 2020/0102658 | A1 | 4/2020 | Wang et al. |
| 2020/0355306 | A1 | 11/2020 | Gray et al. |
| 2020/0362996 | A1 | 11/2020 | Ries et al. |

FOREIGN PATENT DOCUMENTS

| | | |
|---|---|---|
| AU | 2017302735 | 1/2019 |
| AU | 2014310509 | 3/2019 |
| AU | 2017319390 | 3/2019 |
| AU | 2017347152 | 5/2019 |
| AU | 2017365730 | 6/2019 |
| AU | 2018211384 | 8/2019 |
| AU | 2018222217 | 8/2019 |
| AU | 2015335367 | 10/2019 |
| AU | 2015345613 | 10/2019 |
| AU | 2018288000 | 1/2020 |
| AU | 2019279941 | 1/2020 |
| BR | 112014017998 | 1/2019 |
| BR | 112018013586 | 1/2019 |
| BR | PI0810573 | 1/2019 |
| BR | PI0819542 | 1/2019 |
| BR | 112019001414 | 2/2019 |
| BR | 112018075840 | 3/2019 |
| BR | 112019004048 | 3/2019 |
| BR | PI0517181 | 3/2019 |
| BR | 112019000076 | 4/2019 |
| BR | 112019007789 | 4/2019 |
| BR | PI0914836 | 4/2019 |
| BR | 112019003669 | 5/2019 |
| BR | 112019005154 | 6/2019 |
| BR | 112013032388 | 7/2019 |
| BR | 112019013850 | 7/2019 |
| BR | PI0720487 | 8/2019 |
| BR | 112012015257 | 9/2019 |
| BR | 112013017957 | 9/2019 |
| BR | 112015027495 | 9/2019 |
| BR | 112016001932 | 9/2019 |
| BR | PI0909348 | 9/2019 |
| BR | 112015002088 | 10/2019 |
| BR | 112019020051 | 10/2019 |
| BR | 112012020776 | 11/2019 |
| BR | 112019012614 | 11/2019 |
| BR | PI0808956 | 11/2019 |
| BR | 112013028806 | 12/2019 |
| BR | 112013000428 | 1/2020 |
| BR | PI0924891 | 1/2020 |
| CA | 2655039 | 12/2007 |
| CA | 2859433 | 3/2019 |
| CA | 2823056 | 4/2019 |
| CA | 2765294 | 6/2019 |

(56) References Cited

FOREIGN PATENT DOCUMENTS

| | | |
|---|---|---|
| CA | 2854955 | 6/2019 |
| CA | 2835008 | 8/2019 |
| CA | 3012146 | 1/2020 |
| CN | 104819349 | 8/2016 |
| CN | 107023726 | 8/2017 |
| CN | 107061905 | 8/2017 |
| CN | 107642648 | 1/2018 |
| CN | 109153196 | 1/2019 |
| CN | 109153229 | 1/2019 |
| CN | 109958827 | 7/2019 |
| CN | 110044550 | 7/2019 |
| CN | 110177969 | 8/2019 |
| CN | 106985493 | 11/2019 |
| CN | 108291686 | 11/2019 |
| CN | 110461586 | 11/2019 |
| CN | 110462273 | 11/2019 |
| CN | 107250643 | 12/2019 |
| CN | 108291670 | 1/2020 |
| DE | 102018214615 | 6/2019 |
| DK | 3224393 T3 | 1/2019 |
| DK | 2820083 T3 | 2/2019 |
| DK | 2959199 T5 | 2/2019 |
| DK | 3228639 T3 | 2/2019 |
| DK | 2780159 T3 | 4/2019 |
| DK | 3196523 T3 | 4/2019 |
| DK | 2516534 | 7/2019 |
| DK | 2901062 T3 | 8/2019 |
| DK | 3286474 T3 | 9/2019 |
| EP | 2360406 | 1/2019 |
| EP | 2780159 | 1/2019 |
| EP | 3069063 | 1/2019 |
| EP | 3433523 | 1/2019 |
| EP | 3089846 | 2/2019 |
| EP | 3334969 | 2/2019 |
| EP | 3334970 | 2/2019 |
| EP | 3439871 | 2/2019 |
| EP | 2386894 | 3/2019 |
| EP | 2516534 | 3/2019 |
| EP | 2737238 | 3/2019 |
| EP | 2859173 | 3/2019 |
| EP | 3371502 | 3/2019 |
| EP | 3455059 | 3/2019 |
| EP | 3455536 | 3/2019 |
| EP | 3458531 | 3/2019 |
| EP | 2862700 | 4/2019 |
| EP | 3105484 | 4/2019 |
| EP | 3258155 | 4/2019 |
| EP | 3334965 | 4/2019 |
| EP | 3334967 | 4/2019 |
| EP | 3463849 | 4/2019 |
| EP | 3468725 | 4/2019 |
| EP | 3469244 | 4/2019 |
| EP | 3314155 | 5/2019 |
| EP | 3488135 | 5/2019 |
| EP | 2519764 | 6/2019 |
| EP | 2572134 | 7/2019 |
| EP | 2661578 | 7/2019 |
| EP | 3507535 | 7/2019 |
| EP | 3513108 | 7/2019 |
| EP | 2576333 | 8/2019 |
| EP | 3014157 | 8/2019 |
| EP | 3059481 | 8/2019 |
| EP | 3526437 | 8/2019 |
| EP | 2588787 | 9/2019 |
| EP | 2870397 | 9/2019 |
| EP | 3093546 | 10/2019 |
| EP | 3548280 | 10/2019 |
| EP | 3350498 | 12/2019 |
| EP | 3482112 | 12/2019 |
| EP | 3583344 | 12/2019 |
| FR | 3068104 | 7/2019 |
| FR | 3077997 | 8/2019 |
| FR | 3074251 | 12/2019 |
| FR | 3076337 | 1/2020 |
| GB | 2535925 | 8/2016 |
| GB | 2503880 | 3/2019 |
| GB | 2562674 | 3/2019 |
| GB | 2557571 | 9/2019 |
| GB | 2572120 | 9/2019 |
| GB | 2520756 | 10/2019 |
| GB | 2535925 | 12/2019 |
| GB | 2574296 | 12/2019 |
| HU | E045956 T2 | 1/2020 |
| IN | 330637 | 1/2020 |
| PL | 2678216 T3 | 2/2019 |
| PL | 2379299 T3 | 5/2019 |
| RU | 2018113428 | 10/2019 |
| WO | 2015/014365 | 2/2015 |
| WO | 2016/092214 | 6/2016 |
| WO | 2016/170360 | 10/2016 |
| WO | 2017/001774 | 1/2017 |
| WO | 2017/097931 | 6/2017 |
| WO | 2018/224566 | 12/2018 |
| WO | 2019/016554 | 1/2019 |
| WO | 2019/016558 | 1/2019 |
| WO | 2019/073047 | 4/2019 |
| WO | 2019/022599 | 5/2019 |
| WO | 2019/099219 | 5/2019 |
| WO | 2019/105926 | 6/2019 |
| WO | 2019/112431 | 6/2019 |
| WO | 2019/120677 | 6/2019 |
| WO | 2019/129806 | 7/2019 |
| WO | 2019/141326 | 7/2019 |
| WO | 2019/165562 | 9/2019 |
| WO | 2019/197538 | 10/2019 |
| WO | 2019/207031 | 10/2019 |
| WO | 2019/238456 | 12/2019 |
| WO | 2020/016325 | 1/2020 |

OTHER PUBLICATIONS

United States Patent and Trademark Office; PCT International Search Report, issued in connection to application No. PCT/US20/61612; dated Feb. 10, 2021; 2 pages; US.

United States Patent and Trademark Office; PCT Written Opinion of the International Searching Authority, issued in connection to application No. PCT/US20/61612; dated Feb. 10, 2021; 14 pages; US.

Bertoni, Fabiano; End Fitting for Unbonded Flexible Pipes; Apr. 2017; 8 pages; Simeros Technologies.

Bai, Yong et al.; Tensile Armor Layer; 2010; 15 pages; Science Direct.

Tanaka, Rafael L. et al.; Flexible Pipe Anchoring System: Resin Ration Effects on Mechanical Properties; Jun. 5, 2015; 6 pages; Proceedings of the ASME 2015 43th International Conference on Ocean, Offshore and Arctic Engineering.

* cited by examiner

POTTED PIPE FITTING SYSTEMS AND METHODS

CROSS-REFERENCE

The present disclosure claims priority to and benefit of U.S. Provisional Patent Application No. 62/939,386, entitled "POTTED END FITTING FOR FLEXIBLE PIPE AND METHODS OF INSTALLING SAME" and filed Nov. 22, 2019, which is incorporated herein by reference in its entirety for all purposes.

BACKGROUND

The present disclosure generally relates to pipeline systems and, more particularly, to a pipe fitting that may be deployed in a pipeline system.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments in addition to one or more pipe (e.g., midline and/or end) fittings (e.g., connectors), for example, which are used to couple a pipe segment to another pipeline component, such as another pipe fitting, another pipe segment, a fluid source, and/or a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid (e.g., clean and/or potable water).

To facilitate improving fluid isolation, in some instances, the tubing of a pipe segment may include multiple layers. For example, the tubing of a pipe segment may include an internal pressure sheath layer and an outer sheath layer that each run (e.g., span) the length of the pipe segment. To facilitate improving its collapse (e.g., crush) resistance, in some instances, the pipe segment tubing may additionally include a carcass layer disposed within its internal pressure sheath layer. Additionally, the pipe segment tubing may include one or more intermediate layers disposed between its internal pressure sheath layer and its outer sheath layer. For example, to facilitate improving its tensile strength and/or its the hoop strength, the one or more intermediate layers of pipe segment tubing may include a reinforcement layer, which is made from a solid material that has a higher tensile strength and/or a higher linear elasticity modulus (e.g., stiffness) than the solid material that is used to fabricate the inner barrier layer and/or the outer barrier layer of the pipe segment tubing.

In any case, as described above, the tubing of a pipe segment may generally be secured and sealed in a pipe fitting. Generally, a pipe fitting may include a fitting body that defines a fitting bore in which the internal pressure sheath layer and the carcass layer of the pipe segment tubing are to be disposed. To facilitate securing the pipe fitting to pipe segment tubing, the fitting body of the pipe fitting may additionally define a potting cavity in which reinforcement strips from one or more intermediate (e.g., reinforcement) layers of the pipe segment tubing are to be anchored (e.g., secured).

Generally, the fitting body of a pipe fitting may be implemented to directly abut and, thus, reinforce a portion of the internal pressure sheath layer of a pipe segment. Additionally, a reinforcement strip in a pipe segment may generally reinforce the internal pressure sheath layer of the pipe segment when the reinforcement strip is disposed between the internal pressure sheath layer and the outer sheath layer of the pipe segment at a target lay angle. However, when anchored in a potting cavity of a pipe fitting, a portion of a reinforcement strip in a pipe segment may be flared away from the internal pressure sheath layer of the pipe segment. In other words, in some instances, a gap between reinforcement provided by the pipe fitting and reinforcement provided by a reinforcement strip of a corresponding pipe segment may potentially result in a weak point developing in the pipe fitting, which, at least in some instances, may reduce operational efficiency and/or operational reliability of a pipeline system in which the pipe fitting is deployed, for example, due to fluid pressure within the pipe bore of the pipe segment inadvertently producing a breach (e.g., hole or opening) through the weak point in the pipe fitting.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipeline system includes a pipe segment and a potted pipe fitting. The pipe segment includes tubing having an internal pressure sheath layer that defines a pipe bore, a reinforcement strip implemented around the internal pressure sheath layer to define a fluid conduit within a tubing annulus of the pipe segment, and an outer sheath layer implemented around the reinforcement strip. The potted pipe fitting includes an outer fitting body disposed around a portion of the reinforcement strip in the pipe segment, an inner fitting body disposed between the portion of the reinforcement strip and the internal pressure sheath layer of the pipe segment, in which the inner fitting body directly abuts the internal pressure sheath layer at least up to a point where the reinforcement strip begins to flare away from the internal pressure sheath layer and a potting cavity of the potted pipe fitting is defined at least between an inner surface of the outer fitting body and an outer surface of the inner fitting body, and cured potting material implemented around the portion of the reinforcement strip in the potting cavity to secure the potted pipe fitting to the pipe segment.

In another embodiment, a method of implementing a pipe fitting at pipe segment tubing includes disposing an outer fitting body of the pipe fitting around the pipe segment tubing, cutting back an outer sheath layer of the pipe segment tubing to expose a portion of a reinforcement strip in the pipe segment tubing, inserting an inner fitting body of the pipe fitting between the portion of the reinforcement strip and an internal pressure sheath layer of the pipe segment tubing such that the inner fitting body directly abuts the internal pressure sheath layer at least up to a point where the reinforcement strip begins to flare away from the internal pressure sheath layer, defining a potting cavity of the pipe fitting at least in part by sliding the outer fitting body of the pipe fitting over the portion of the reinforcement strip in the pipe segment tubing and the inner fitting body of the pipe fitting, and disposing potting material around the portion of the reinforcement strip in the potting cavity of the pipe fitting to facilitate securing the pipe fitting to the pipe segment tubing.

In another embodiment, a pipe fitting includes an outer fitting body having a conical inner surface, in which the outer fitting body is to be disposed around an exposed portion of a reinforcement strip in pipe segment tubing, an inner fitting body having a conical outer surface, in which the inner fitting body is to be disposed between the exposed portion of the reinforcement strip and an internal pressure sheath layer of the pipe segment tubing, and a fitting connector that enables the pipe fitting to be connected to another pipeline component. The outer fitting body and the inner fitting body are to be secured to the fitting connector to define a potting cavity in which the exposed portion of the reinforcement strip is to be anchored between the conical inner surface of the outer fitting body and the conical outer surface of the inner fitting body such that the potting cavity has a continuous uniform wedge-shaped axial cross-section profile.

DETAILED DESCRIPTION

Figure 1:
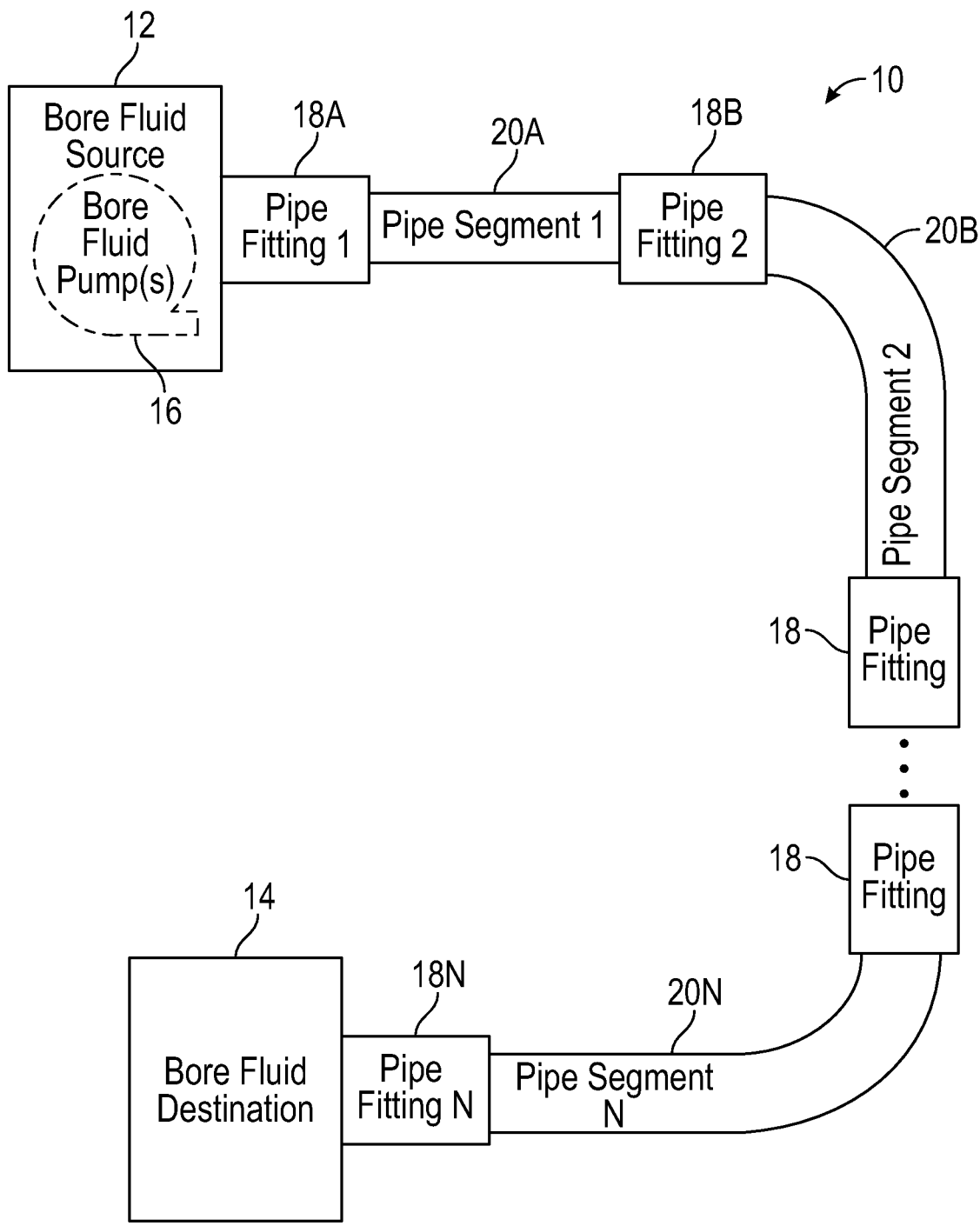
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification. Furthermore, it should be appreciated that the depicted examples are merely intended to be illustrative and not limiting The present disclosure generally relates to pipeline systems that may be implemented and/or operated to transport (e.g., convey) fluid, such as liquid and/or gas, from a fluid source to a fluid destination. Generally, a pipeline system may include pipe fittings, such as a midline pipe fitting and/or a pipe end fitting, and one or more pipe segments. More specifically, a pipe segment may generally be secured and sealed in one or more pipe fittings to facilitate fluidly coupling the pipe segment to another pipeline component, such as another pipe segment, another pipe fitting, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, a pipe segment generally includes tubing that defines (e.g., encloses) a pipe bore, which provides a primary fluid conveyance (e.g., flow) path through the pipe segment. More specifically, the tubing of a pipe segment may be implemented to facilitate isolating environmental conditions external to the pipe segment from conditions within its pipe bore and, thus, fluid that flows therethrough. In particular, the tubing of a pipe segment may primarily be implemented to block fluid flow directly between the pipe bore of the pipe segment and its external environmental conditions, for example, in addition to providing thermal, pressure, and/or electrical isolation (e.g., insulation).

To facilitate improving fluid isolation, in some instances, the tubing of a pipe segment may be implemented with multiple tubing layers. For example, the tubing of a pipe segment may include an internal pressure sheath (e.g., inner barrier) layer and an outer sheath (e.g., outer barrier) layer that are each implemented to run (e.g., span) the length of the pipe segment. In particular, the internal pressure sheath layer and the outer sheath layer may each be implemented as a continuous layer of solid material, such as plastic, that runs the length of the pipe segment.

In some instances, the tubing of a pipe segment may additionally include one or more intermediate layers implemented between its internal pressure sheath layer and its outer sheath layer and, thus, in a tubing annulus of the pipe segment. In particular, to facilitate improving its tensile strength and/or its hoop strength, in some instances, the intermediate layers of pipe segment tubing may include one or more reinforcement (e.g., pressure armor and/or tensile armor) layers, which each has one or more solid (e.g., reinforcement) strips that are implemented at a target lay angle with material that has a higher tensile strength and/or a higher linear elasticity modulus (e.g., stiffness) than material that is used to implement the internal pressure sheath layer and/or the outer sheath layer of the pipe segment tubing. For example, a reinforcement strip may be implemented using metal, such as steel, while the internal pressure sheath layer and the outer sheath layer of the pipe segment tubing are implemented using plastic, such as high-density polyethylene (HDPE). Additionally or alternatively, the intermediate layers of pipe segment tubing may include one or more tape layers, one or more intermediate sheath layers, one or more anti-wear layers, one or more insulation layers, or any combination thereof.

Furthermore, in some instances, a pipe segment may be deployed in an elevated pressure environment, for example, underwater in a subsea application. To facilitate improving its collapse and/or crush resistance, in some instances, the tubing of the pipe segment may additionally include a carcass layer implemented within its internal pressure sheath layer. In other words, in such instances, the internal pressure sheath layer may be implemented around the carcass layer and, thus, the carcass layer may be the innermost layer of the pipe segment tubing.

In any case, as described above, the tubing of a pipe segment may generally be secured and sealed in a pipe fitting. To facilitate securing pipe segment tubing therein, a pipe fitting may include a fitting body that defines a fitting bore in which the internal pressure sheath layer and the carcass layer of the pipe segment tubing are to be disposed. However, in some instances, the pipe segment tubing may potentially pull out (e.g., separate) from the fitting bore of the pipe fitting. As such, to facilitate securing the pipe fitting to pipe segment tubing, the fitting body of the pipe fitting may additionally define a potting cavity in which reinforcement strips from one or more intermediate (e.g., reinforcement) layers of the pipe segment tubing are to be anchored (e.g., secured). In other words, the fitting body may define the potting cavity circumferentially (e.g., concentrically) around the fitting bore and cured potting material, such as epoxy, may be implemented around a portion of a reinforcement strip that is disposed within the potting cavity to facilitate securing the tubing of a corresponding pipe segment to the fitting body.

Generally, the fitting body of a pipe fitting may be implemented to directly abut and, thus, reinforce a portion of the internal pressure sheath layer of a pipe segment. Additionally, as described above, a reinforcement strip in a pipe segment may generally reinforce the internal pressure sheath layer of the pipe segment when the reinforcement strip is disposed between the internal pressure sheath layer and the outer sheath layer of the pipe segment at a target lay angle. However, when anchored in a potting cavity of a pipe fitting, a portion of a reinforcement strip in a pipe segment may be flared away from the internal pressure sheath layer of the pipe segment. In other words, in some instances, a gap between reinforcement provided by the pipe fitting and reinforcement provided by a reinforcement strip of a corresponding pipe segment may potentially result in a weak point developing in the pipe fitting, which, at least in some instances, may reduce operational efficiency and/or operational reliability of a pipeline system in which the pipe fitting is deployed, for example, due to fluid pressure within the pipe bore of the pipe segment inadvertently producing a breach (e.g., hole or opening) through the weak point in the pipe fitting.

Accordingly, to facilitate improving pipeline operational efficiency and/or pipeline operational reliability, the present disclosure provides techniques for implementing and/or deploying a pipe fitting—namely a potted pipe fitting—that improves the reinforcement the potted pipe fitting provides to the tubing of a pipe segment that is secured and sealed therein. As will be described in more detail below, the fitting body of a potted pipe fitting may generally include an inner fitting body, an outer fitting body, and a fitting body collar.

In particular, the inner fitting body may be implemented to be disposed between the internal pressure sheath layer and one or more reinforcement strips of the tubing of a pipe segment while the outer fitting body may be implemented to be disposed around the one or more reinforcement strips of the pipe segment tubing.

To facilitate connecting another pipeline component thereto, the potted pipe fitting may additionally include a fitting connector (e.g., flange) that is implemented to be secured to its outer fitting body and its inner fitting body, for example, via one or more threaded fasteners, such as a bolt or a screw. In particular, in some embodiments, the outer fitting body may be implemented to overlap with the inner fitting body and a portion of the fitting connector such that the potting cavity of the potted pipe fitting is defined therebetween. In other words, in such embodiments, a first portion of the potting cavity may be defined between an inner surface of the outer fitting body and an outer surface of the portion of the fitting connector and a second portion of the potting cavity may be defined between the inner surface of the outer fitting body and an outer surface of the inner fitting body.

However, to facilitate easing securement of a fitting connector to a corresponding inner fitting body and/or to facilitate reducing overall size (e.g., footprint) of a potted pipe fitting, in other embodiments, the outer fitting body of the potted pipe fitting may be implemented to overlap with the inner fitting body, but not the fitting connector. In other words, in such embodiments, the potting cavity of the potted pipe fitting may be defined just between the inner surface of the outer fitting body and the outer surface of the inner fitting body. In fact, to facilitate further easing securement of a fitting connector to an inner fitting body, in some embodiments, a fastener opening in the inner fitting body may be implemented on a lip (e.g., extension) that extends radially out toward a corresponding outer fitting body.

In any case, to facilitate sealing pipe segment tubing therein, a potted pipe fitting may additionally include one or more fitting seals. In particular, in some embodiments, the potted pipe fitting may include an inner fitting seal, which is implemented to be compressed between its inner fitting body, its fitting connector, and the internal pressure sheath layer of pipe segment tubing. Additionally, the potted pipe fitting may include an outer fitting seal, which is implemented to be compressed between its outer fitting body, its fitting body collar, and the outer sheath layer of pipe segment tubing.

Thus, to facilitate sealing and securing pipe segment tubing in a potted pipe fitting, the fitting body collar, the outer fitting seal, and the outer fitting body of the potted pipe fitting may be disposed (e.g., slid) around the pipe segment tubing. Additionally, the outer sheath layer of the pipe segment tubing may be cut back to expose a portion of one or more reinforcement strips in the pipe segment tubing. In some embodiments, a reinforcement strip in pipe segment tubing may be implemented at a target lay angle relative to the longitudinal axis of the pipe segment tubing to facilitate optimizing (e.g., balancing) the reinforcement (e.g., tensile strength and/or the hoop strength) provided by the reinforcement strip. In fact, in some embodiments, reinforcement strips in different reinforcement (e.g., intermediate) layers of pipe segment tubing may have different target lay angles, for example, to enable a corresponding reinforcement layer to act as a pressure armor layer, a tensile armor layer, or both.

However, as described above, the outer fitting seal of the potted pipe fitting may be activated by compressing the outer fitting seal against the outer sheath layer of pipe segment tubing. Additionally, as described above, in some embodiments, the outer sheath layer of pipe segment tubing may be implemented using plastic, such as high-density polyethylene (HDPE), which may be relatively easy to deform. Thus, to facilitate separating (e.g., isolating) the sealing function provided by the outer fitting seal from the reinforcement function provided by a reinforcement layer (e.g., one or more reinforcement strips) of the pipe segment tubing, in some embodiments, a rigid reinforcement sleeve may be inserted and secured between a (e.g., non-cutback) portion of the outer sheath layer and a corresponding portion of the reinforcement layer.

In any case, the inner fitting body of the potted pipe fitting may then be disposed (e.g., inserted) between the internal pressure sheath layer and one or more reinforcement strips of the pipe segment tubing. In particular, to facilitate supporting the pipe segment tubing using the potted pipe fitting, in some embodiments, the inner fitting body of the potted pipe fitting may be implemented to be inserted under a reinforcement layer of a pipe segment at least up to a point where one or more reinforcement strips of the pipe segment begin to flare away from the internal pressure sheath layer of the pipe segment. For example, in such embodiments, the inner fitting body may be implemented to be inserted at least up to a point where the outer sheath layer is cutback and/or the beginning of a rigid reinforcement sleeve (e.g., and potentially overlapping with a remaining portion of the outer sheath layer and/or a portion of the rigid reinforcement sleeve). However, in other embodiments, a potted pipe fitting may support the tubing of a pipe segment via a separate spacer ring, which is implemented to be secured around the internal pressure sheath layer of the pipe segment tubing between an end of its inner fitting body and one or more reinforcement strips of the pipe segment tubing, for example, to enable the spacer ring to provide electrical continuity (e.g., and, thus, cathodic protection) to the one or more reinforcement strips.

In any case, the outer fitting body of the potted pipe fitting may then be slid over the exposed portion of the reinforcement layer (e.g., one or more reinforcement strips) to define the potting cavity of the potted pipe fitting. In particular, in some embodiments, a potted pipe fitting may be implemented with a potting cavity that has a non-uniform axial cross-section profile (e.g., shape). For example, in some such embodiments, a first portion of the potting cavity, which is farther from the outer sheath layer of a corresponding pipe segment, may be implemented with a wedge-shaped axial cross-section profile, while a second portion of the potting cavity, which is closer to the outer sheath layer of the pipe segment, may be implemented with a different axial cross-section profile, such as another wedge-shaped axial cross-section profile. However, a potting cavity with a non-uniform axial cross-section profile may result in force non-uniformly being distributed across the potting cavity and, thus, stress concentration zones developing within the potting cavity, which, at least in some instances, may limit anchoring strength provided by cured potting material in the potting cavity, for example, due to the non-uniform force distribution causing different portions of the cured potting material to break at substantially different times.

Accordingly, to facilitate improving the strength with which pipe segment tubing can be secured (e.g., anchored) in a potted pipe fitting, in other embodiments, the potted pipe fitting may be implemented with a potting cavity that has a continuous (e.g., single) uniform axial cross-section profile (e.g., shape). For example, in some such embodiments, the potting cavity of a potted pipe fitting may be implemented with a continuous uniform wedge-shaped axial cross-section profile. To facilitate defining a potting cavity with a continuous uniform wedge-shaped axial cross-section profile, in some embodiments, the outer fitting body of a potted pipe fitting may be implemented with a conical inner surface while the inner fitting body of the potted pipe fitting may be implemented with a conical outer surface, which is slanted at a different angle as compared to the conical inner surface of the outer fitting body.

In any case, fluid (e.g., liquid) potting material, such as epoxy, may then be flowed into the potting cavity of the potted pipe fitting. After curing (e.g., hardening and/or solidifying), a solid mass of cured potting material may encase the portion of one or more reinforcement strips present in the potting cavity and, thus, facilitate anchoring the one or more reinforcement strip in the potted pipe fitting. Additionally, the body collar of the potted pipe fitting may be secured to the outer fitting body, for example, to facilitate sealing the pipe segment tubing by compressing the outer fitting seal between the outer fitting body, the fitting body collar, and the outer sheath layer of the pipe segment tubing. In this manner, the present disclosure provides techniques for implementing and/or deploying a potted pipe fitting to facilitate improving the reinforcement the potted pipe fitting provides to the tubing of a corresponding pipe segment, which, at least in some instances, may facilitate improving pipeline operational efficiency and/or pipeline operational reliability, for example, by reducing the likelihood of fluid pressure within the pipe bore of the pipe segment producing a breach within the potted pipe fitting.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be at the bore fluid source 12, for example, when fluid flow through the bore of the pipeline system 10 is produced by gravity. Additionally or alternatively, in other embodiments, one or more bore fluid pumps 16 may be in the pipeline system 10 and/or at the bore fluid destination 14.

To facilitate transporting fluid from the bore fluid source 12 to the bore fluid destination 14, as in the depicted example, a pipeline system 10 may include one or more pipe fittings 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer than three (e.g., two or one) pipe segments 20 or more than three (e.g., four, five, or more) pipe segments 20. Additionally or alternatively, in other embodiments, a pipeline system 10 may include fewer than four (e.g., three or two) pipe fittings 18 or more than four (e.g., five, six, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may include multiple different tubing layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may additionally define free space (e.g., one or more gaps) devoid of solid material in its annulus. In fact, in some embodiments, the free space in the tubing annulus of a pipe segment 20 may run (e.g., span) the length of the pipe segment 20 and, thus, define (e.g., enclose) one or more fluid conduits in the annulus of the tubing, which are separate from the pipe bore. In other words, in such embodiments, fluid may flow through a pipe segment 20 via its pipe bore, a fluid conduit defined within its tubing annulus, or both.

Figure 2:
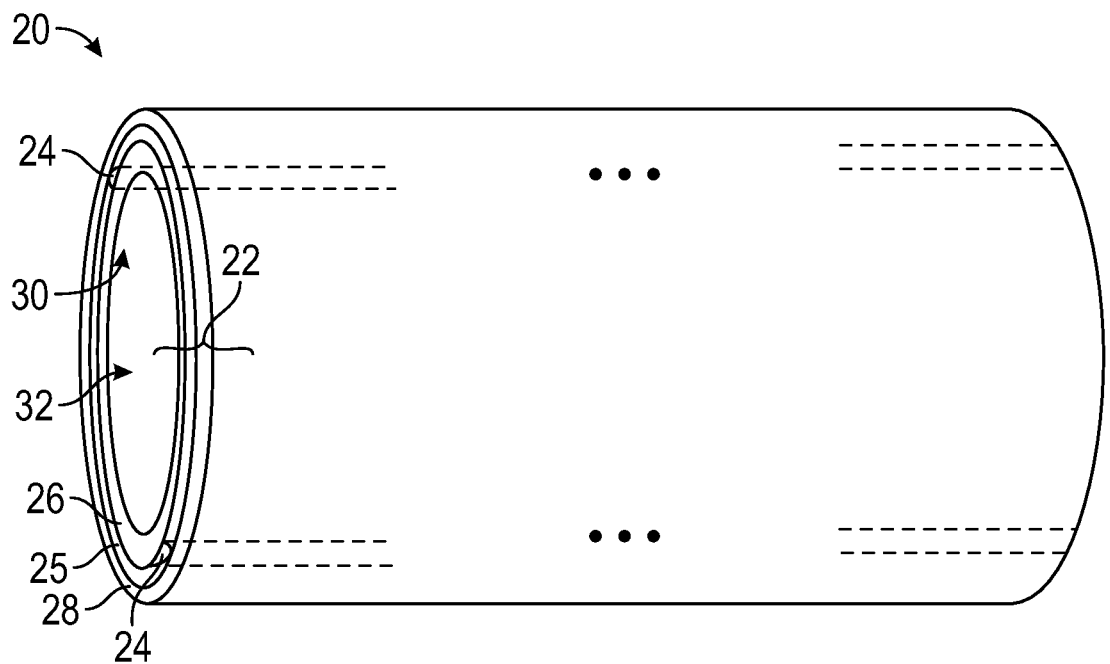
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with annular gaps (e.g., fluid conduits and/or free space) 24 defined in its annulus 25, is shown in FIG. 2. As depicted, the pipe segment tubing 22 has multiple tubing layers including an internal pressure sheath (e.g., inner barrier) layer 26 and an outer sheath (e.g., outer barrier) layer 28. In some embodiments, the internal pressure sheath layer 26 and/or the outer sheath layer 28 of the pipe segment tubing 22 may be made using composite material and/or plastic, such as high-density polyethylene (HDPE), raised temperature polyethylene (PE-RT), cross-linked polyethylene (XLPE), polyamide 11 (PA-11), polyamide 12 (PA-12), polyvinylidene difluoride (PVDF), or any combination thereof. Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the internal pressure sheath layer 26 defines (e.g., encloses) a pipe bore 32 through which fluid can flow, for example, to facilitate transporting fluid from a bore fluid source 12 to a bore fluid destination 14.

Additionally, as depicted, the tubing annulus 25 of the pipe segment 20 is implemented between its internal pressure sheath layer 26 and its outer sheath layer 28. As will be described in more detail below, the tubing annulus 25 of a pipe segment 20 may include one or more intermediate layers. Furthermore, as depicted, annular gaps 24 running along the length of the pipe segment 20 are defined (e.g., enclosed) in the tubing annulus 25. As described above, an annular gap 24 in the tubing annulus 25 may be devoid of solid material. As such, pipe segment tubing 22 that includes one or more annular gaps 24 defined therein may exert less resistance to flexure, for example, as compared to solid pipe segment tubing 22 and/or pipe segment tubing 22 that does not include annular gaps 24 defined its annulus 25. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, a pipe segment 20 may include fewer than two (e.g., one) or more than two (e.g., three, four, or more) annular gaps 24 defined in its tubing annulus 25. Additionally or alternatively, in other embodiments, an annular gap 24 defined in the tubing annulus 25 of a pipe segment 20 may run non-parallel to the pipe bore 32 of the pipe segment 20, for example, such that the annular gap 24 is skewed relative to the longitudinal extent of the pipe bore 32.

Figure 3:
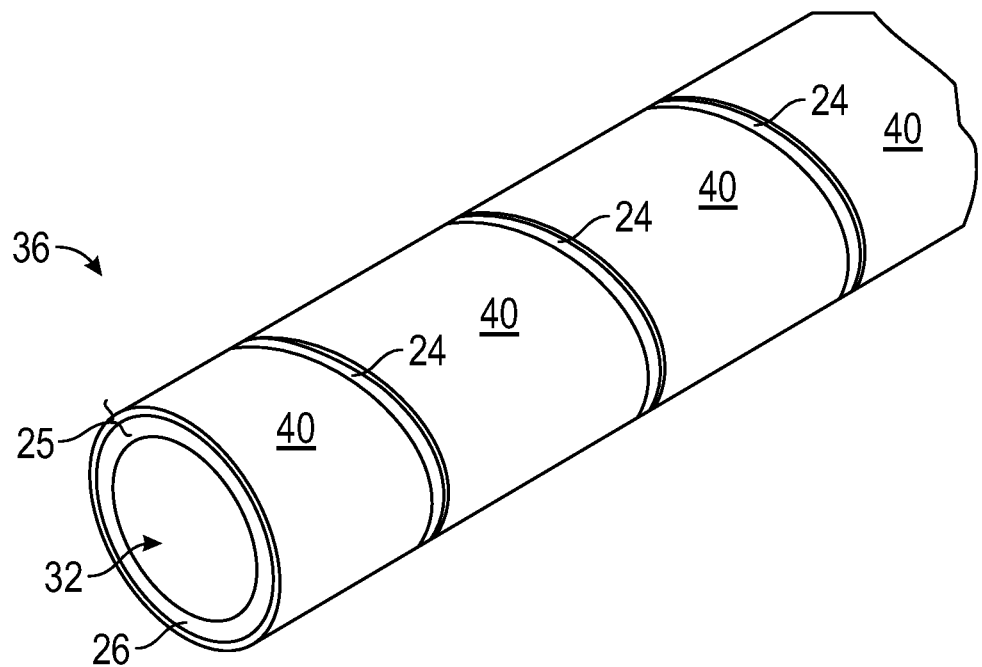
FIG. 3 is an example of a portion of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an internal pressure sheath layer 26 and an intermediate layer—namely a reinforcement layer 34—included in the annulus 25 of its pipe segment tubing 22, is shown in FIG. 3. However, it should be appreciated that the depicted example is merely intended to be illustrative and not limiting. In particular, in other embodiments, the intermediate layers of pipe segment tubing 22 may additionally or alternatively include one or more tape layers, one or more insulation layers one or more intermediate sheath layers, one or more anti-wear layers, or any combination thereof.

In any case, as depicted, the reinforcement layer 34 includes a reinforcement strip 40. To facilitate improving tensile strength and/or hoop strength of pipe segment tubing 22, in some embodiments, a reinforcement strip 40 in the pipe segment tubing 22 may be made at least in part using solid material that has a higher tensile strength and/or a higher linear elasticity modulus (e.g., stiffness) than solid material that is used to make the internal pressure sheath layer 26 and/or the outer sheath layer 28 of the pipe segment tubing. For example, the internal pressure sheath layer 26 may be made using plastic, such as high-density polyethylene (HDPE), while the reinforcement strip 40 is made using metal, such as carbon steel, stainless steel, duplex stainless steel, super duplex stainless steel, or any combination thereof. In other words, at least in some such embodiments, a reinforcement strip 40 of the pipe segment tubing 22 may be made using electrically conductive material, which, at least in some instances, may enable communication of electrical (e.g., control and/or sensor) signals via the reinforcement strip 40. However, in other embodiments, one or more reinforcement strips 40 of pipe segment tubing 22 may additionally or alternatively be made at least in part using a composite material.

Additionally, as depicted, the reinforcement strip 40 is helically disposed (e.g., wound and/or wrapped) on the internal pressure sheath layer 26 such that gaps (e.g., openings) are left between adjacent windings to define an annular gap (e.g., fluid conduit) 24. In other words, in some embodiments, the reinforcement layer 34 may be formed at least in part by winding the reinforcement strip 40 around the internal pressure sheath layer 26 at a non-zero lay angle (e.g., fifty-two degrees) relative to the longitudinal axis of the pipe bore 32. As described above, a reinforcement strip 40 may generally have a target lay angle that facilitates optimizing (e.g., balancing) the tensile strength and the hoop strength provided by the reinforcement strip 40. In fact, in some embodiments, reinforcement strips 40 in different reinforcement layers 34 of pipe segment tubing 22 may have different target lay angles, for example, to enable a corresponding reinforcement layer 34 to act as a pressure armor layer, a tensile armor layer, or both. In any case, as depicted, the resulting annular gap 24 runs helically along the pipe segment 20, for example, such that the annular gap 24 is skewed fifty-two degrees relative to the longitudinal axis of the pipe bore 32.

However, it should again be appreciated that the depicted example is merely intended to be illustrative and not limiting. In particular, in some embodiments, one or more other intermediate layers, such as an anti-wear layer, may be disposed between the internal pressure sheath layer 26 and a reinforcement layer 34 of pipe segment tubing 22. In other words, in some such embodiments, a reinforcement strip 40 of the reinforcement layer 34 may be disposed on another intermediate layer, for example, instead of directly on the internal pressure sheath layer 26 of the pipe segment tubing 22. Moreover, in other embodiments, a reinforcement layer 34 of pipe segment tubing 22 may include multiple reinforcement strips 40.

In any case, in some embodiments, an outer sheath layer 28 may be disposed directly over the depicted reinforcement layer 34 and, thus, cover and/or define (e.g., enclose) the depicted annular gap 24. However, in other embodiments, the tubing annulus 25 of pipe segment tubing 22 may include multiple (e.g., two, three, four, or more) reinforcement layers 34. In other words, in such embodiments, one or more other reinforcement layers 34 may be disposed over the depicted reinforcement layer 34. In fact, in some such embodiments, the reinforcement strips 40 in the one or more other reinforcement layers 34 may also each be helically disposed such that there are annular gaps (e.g., fluid conduits and/or free space) 24 between adjacent windings.

For example, a first other reinforcement strip 40 of a first other reinforcement layer 34 may be helically disposed on the depicted reinforcement strip 40 using the same non-zero lay angle as the depicted reinforcement strip 40 to cover (e.g., enclose) the depicted annular gap 24 and to define another annular gap 24 in the first other reinforcement layer 34. Additionally, a second other reinforcement strip 40 of a second other reinforcement layer 34 may be helically disposed on the first other reinforcement strip 40 using another non-zero lay angle, which is the inverse of the non-zero lay angle of the depicted reinforcement strip 40, to define another annular gap 24 in the second other reinforcement layer 34. Furthermore, a third other reinforcement strip 40 of a third other reinforcement layer 34 may be helically disposed on the second other reinforcement strip 40 using the same non-zero lay angle as the second other reinforcement strip 40 to cover the other annular gap 24 in the second other reinforcement layer 34 and to define another annular gap 24 in the third other reinforcement layer 34. In some embodiments, an outer sheath layer 28 may be disposed over the third other reinforcement layer 34 and, thus, cover (e.g., enclose) the other annular gap 24 in the third other reinforcement layer 34.

In any case, as described above, in some instances, a pipe segment 20 may be deployed in an elevated pressure environment, for example, underwater in a subsea application. To facilitate improving the collapse and/or crush resistance of its tubing 22, a carcass layer may be disposed within the internal pressure sheath layer 26 of the pipe segment 20. In other words, in such instances, the internal pressure sheath layer 26 may be disposed around the carcass layer and, thus, the carcass layer may be the innermost layer of the pipe segment tubing 22.

Figure 4:
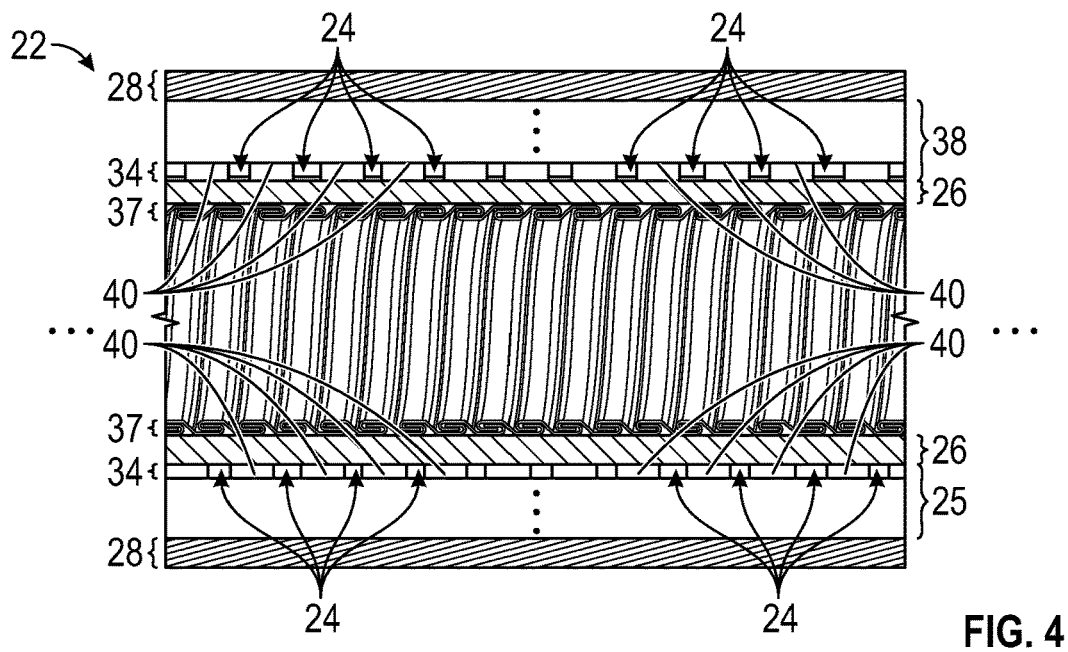
FIG. 4 is an axial cross-section profile of an example of a pipe segment that includes a carcass layer, in accordance with an embodiment of the present disclosure.

To help illustrate, an example of pipe segment tubing 22 that includes a carcass layer 37 is shown in FIG. 4. To facilitate improving collapse and/or crush resistance, in some embodiments, the carcass layer 37 may be made using metal, such as carbon steel, stainless steel, duplex stainless steel, super duplex stainless steel, or any combination thereof. Additionally, as depicted, the carcass layer 37 is an interlocked layer in the pipe segment tubing 22.

In addition to the carcass layer 37, as depicted, the pipe segment tubing 22 includes an internal pressure sheath layer 26 and an outer sheath layer 28. Furthermore, as depicted, the pipe segment tubing 22 includes intermediate layers 38 disposed between the internal pressure sheath layer 26 and the outer sheath layer 28 and, thus, in the annulus 25 of the pipe segment tubing 22. In particular, as depicted, the intermediate layers 38 includes at least a reinforcement layer 34 with one or more reinforcement strips 40 that define one or more annular gaps (e.g., fluid conduits and/or free space) 24 in the tubing annulus 25.

However, it should be appreciated that the depicted example is merely intended to be illustrative and not limiting. In particular, as mentioned above, in some embodiments, the intermediate layers 38 of pipe segment tubing 22 may additionally or alternatively include one or more tape layers, one or more intermediate sheath layers, one or more anti-wear layers, one or more insulation layers, or any combination thereof. Additionally, as described above, in some embodiments, pipe segment tubing 22 may include multiple reinforcement layers 34, which each include one or more reinforcement strips 40. In any case, as described above, in a pipeline system 10, the tubing 22 of a pipe segment 20 may generally be secured and sealed in a pipe fitting 18.

Figure 5:
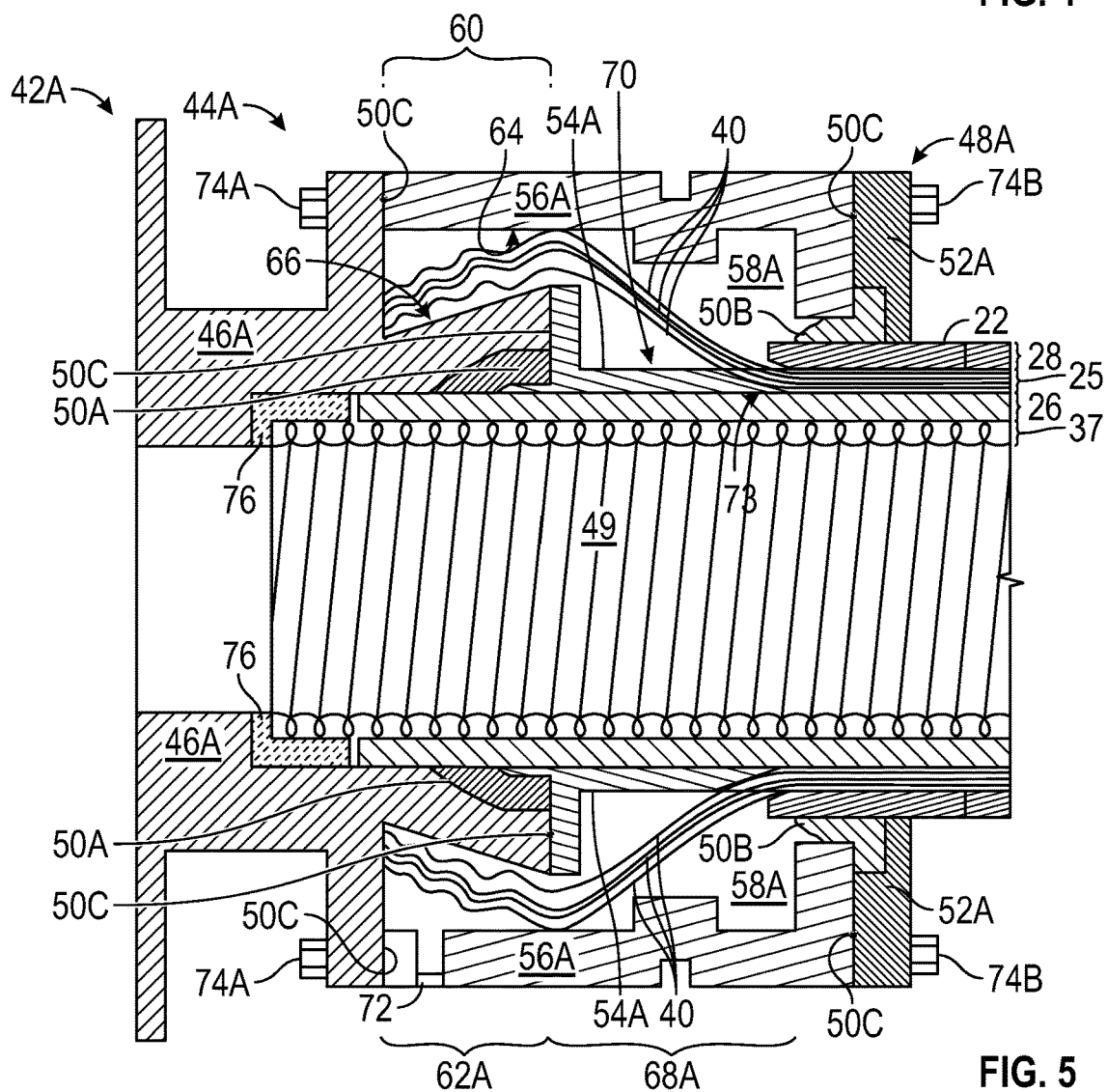
FIG. 5 is axial cross-section profile of a portion of a pipeline system that includes the pipe segment of FIG. 4 and an example of a potted pipe fitting, in accordance with an embodiment of the present disclosure.

To help illustrate, a portion 42A of a pipeline system 10, which includes an example of a pipe fitting 18—namely a potted pipe fitting 44A—and pipe segment tubing 22, is shown in FIG. 5. As in the depicted example, a potted pipe fitting 44 may generally include a fitting connector (e.g., flange) 46 and a fitting body 48, which defines a fitting bore 49. In general, the fitting connector 46 of a pipe fitting 18 may generally be used to secure the pipe fitting 18 to another pipeline component, such as a bore fluid source 12, a bore fluid destination 14, or another pipe fitting 18. Additionally, as in the depicted example, the fitting body 48 of a potted pipe fitting 44 may generally include a fitting collar 52, an inner fitting body 54, and an outer fitting body 56. The inner fitting body 54A may be disposed between the internal pressure sheath layer 26 and one or more reinforcement strips 40 of the pipe segment tubing 22 while the outer fitting body 56A may be disposed around the one or more reinforcement strips 40 of the pipe segment tubing 22.

To facilitate sealing pipe segment tubing 22 therein, as in the depicted example, a potted pipe fitting 44 may additionally include fitting seals 50. In particular, as depicted, the potted pipe fitting 44A includes an inner seal ring 50A, which may be compressed between the fitting connector 46A of the potted pipe fitting 44A, the inner fitting body 54A of the potted pipe fitting 44A, and the internal pressure sheath layer 26 of the pipe segment tubing 22. Additionally, as depicted, the potted pipe fitting 44A includes an outer seal ring 50B, which may be compressed between the outer fitting body 56A, the fitting collar 52A, and the outer sheath layer 28 of the pipe segment tubing 22. In addition to an inner seal ring 50A and an outer seal ring 50B, as in the depicted example, a potted pipe fitting 44 may include one or more face seals 50C, such as a face seal 50C secured between its fitting connector 46 and its outer fitting body 56, a face seal 50C secured between its fitting connector 46 and its inner fitting body 54, and a face seal 50C secured between its outer fitting body 56 and its fitting collar 52.

In some embodiments, one or more fitting seals 50 in a potted pipe fitting 44 may be made using metal, such as carbon steel, stainless steel, duplex stainless steel, super duplex stainless steel, or any combination thereof. However, in other embodiments, one or more fitting seals 50 in a potted pipe fitting 44 may be made using non-metallic material, such as a polymer, rubber, and/or plastic.

In any case, as in the depicted example, in some embodiments, a potting cavity 58 of a potted pipe fitting 44 in which one or more reinforcement strips 40 are to be anchored may be defined when the outer fitting body 56 of the potted pipe fitting 44 is disposed around the inner fitting body 54 of the potted pipe fitting 44 and a portion 60 of the fitting connector 46 of the potted pipe fitting 44. In other words, in such embodiments, a first portion 62 of the potting cavity 58, which is farther from the outer sheath layer 28 of corresponding pipe segment tubing 22, may be defined between an inner surface 64 of the outer fitting body 56 and an outer surface 66 of the portion 60 of the fitting connector 46 while a second portion 68 of the potting cavity 58, which is closer to the outer sheath layer 28 of the pipe segment tubing 22, may be defined between the inner surface 64 of the outer fitting body 56 and an outer surface 70 of the inner fitting body 54. In particular, in the depicted example, the first portion 62A of the potting cavity 58A is defined with a wedge-shaped axial cross-section profile while the second portion 68A of the potting cavity 58A is defined with a different-shaped axial cross-section profile.

However, it should be appreciated that the depicted example is merely intended to be illustrative and not limiting. In particular, as will be described in more detail below, in other embodiments, the outer fitting body 56 of a potted pipe fitting 44 may overlap with the inner fitting body 54 of the potted pipe fitting 44, but not the fitting connector 46 of the potted pipe fitting 44, for example, to reduce the overall size of the potted pipe fitting 44 and/or to ease securement of the fitting connector 46 to the inner fitting body 54. Additionally, although depicted as tapering away from a corresponding inner fitting body 54, as will be described in more detail below, in other embodiments, an inner seal ring 50A of a potted pipe fitting 44 may taper toward the inner fitting body 54. Furthermore, as will be described in more detail below, in other embodiments, a potting cavity 58 of a potted pipe fitting 44 may have a continuous uniform axial cross-section profile, for example, to distribute forces more evenly across the potting cavity 58. Moreover, as will be described in more detail below, in some embodiments, a potted pipe fitting 44 may additionally include a vent valve, which is implemented and/or operated to enable fluid to be selectively vented from free space (e.g., one or more annular gaps 24) defined within the tubing annulus 25 of a pipe segment 20.

In any case, as described above, a reinforcement strip 40 of pipe segment tubing 22 may be anchored in the potting cavity 58 of a potted pipe fitting 44 via cured potting material, such as epoxy. To facilitate flowing fluid potting material into its potting cavity 58, as in the depicted example, a potted pipe fitting 44 may include a potting material port 72, which is fluidly connected to the potting cavity 58. After curing, a solid mass of cured potting material may encase the portion of one or more reinforcement strips 40 present in the potting cavity 58. In other words, the cured potting material may bond to (e.g., grab onto) the portion of the one or more reinforcement strips 40 present in the potting cavity 58, thereby facilitating anchoring of the one or more reinforcement strips 40 in the potting cavity 58 of the potted pipe fitting 44 and, thus, securing the pipe segment tubing 22 in the potted pipe fitting 44.

Additionally, as described above, a reinforcement strip 40 may generally reinforce the tubing 22 of a pipe segment 20 when the reinforcement strip 40 is disposed between the internal pressure sheath layer 26 and the outer sheath layer 28 of the pipe segment tubing 22 at a target lay angle. However, as in the depicted example, to enable one or more reinforcement strips 40 of pipe segment tubing 22 to be anchored in the potting cavity 58 of a potted pipe fitting 44, the outer sheath layer 28 of the pipe segment tubing 22 may be cut back relative to the one or more reinforcement strips 40. In other words, as in the depicted example, this may result in a reinforcement strip 40 of the pipe segment tubing 22 flaring away from the internal pressure sheath layer 26 and, thus, ceasing to reinforce the internal pressure sheath layer 26.

Accordingly, to facilitate reducing the likelihood of a weak point developing therein, a potted pipe fitting 44 may provide reinforcement to pipe segment tubing 22 starting at least at a point 73 where one or more reinforcement strips 40 of the pipe segment tubing 22 cease providing reinforcement. In other words, to facilitate reinforcing pipe segment tubing 22, in some embodiments, the inner fitting body 54 of a potted pipe fitting 44 may be inserted at least up to a point 73 where one or more reinforcement strips 40 of the pipe segment tubing 22 begin to flare away from the internal pressure sheath layer 26 of the pipe segment tubing 22. In fact, in some such embodiments, the inner fitting body 54 of a potted pipe fitting 44 may be partially inserted under a non-cutback portion of the outer sheath layer 28 of the pipe segment tubing 22, for example, to further ensure that a gap is not present between reinforcement provided by the one or more reinforcement strips 40 and the reinforcement provided by the potted pipe fitting 44.

However, it should again be appreciated that the depicted example is merely intended to be illustrative and not limiting. In particular, in other embodiments, a potted pipe fitting 18 may reinforce a portion of the internal pressure sheath layer 26 of a pipe segment 20 via a spacer ring, which is secured around the internal pressure sheath layer 26 between the inner fitting body 54 of the potted pipe fitting 44 and one or more reinforcement strips 40 of the pipe segment tubing 22. More specifically, in some such embodiments, using a separate spacer ring to support a portion of pipe segment tubing 22 may facilitate implementing corrosion protection in the potted pipe fitting 44, for example, at least in part by using the spacer ring to provide electrical continuity to the one or more reinforcement strips 40.

In any case, as in the depicted example, to facilitate securing the outer fitting body 56 of a potted pipe fitting 44 to the fitting connector 46 of the potted pipe fitting 44 and securing the fitting collar 52 of the potted pipe fitting 44 to the outer fitting body 56, the potted pipe fitting 44 may additionally include multiple threaded fasteners 74, such as bolts and/or screws. In particular, as in the depicted example, first threaded fasteners 74A may be used to secure the fitting connector 46 to the outer fitting body 56. Additionally, as in the depicted example, second threaded fasteners 74B may be used to secure the fitting collar 52 to the outer fitting body 56.

However, it should again be appreciated that the depicted example is merely intended to be illustrative and not limiting. In particular, in other embodiments, a fitting connector 46 of a potted pipe fitting 44 may be secured to a corresponding outer fitting body 56 via a single threaded fastener 74 or more than two (e.g., three, four, or more) threaded fasteners 74. Additionally, in other embodiments, a fitting collar 52 of a potted pipe fitting 44 may be secured to a corresponding outer fitting body 56 via a single threaded fastener 74 or more than two (e.g., three, four, or more) threaded fasteners 74.

In any case, as in the depicted example, in some embodiments, a potted pipe fitting 44 may additionally include a carcass (e.g., insulator) ring 76, for example, which is implemented to facilitate anchoring and/or electrically isolating the carcass layer 37 of pipe segment tubing 22 in the potted pipe fitting 44. To facilitate electrically isolating the carcass layer 37, in some embodiments, the carcass ring 76 of a potted pipe fitting 44 may be at least coated with or made from an electrically insulative material, such as plastic. Additionally or alternatively, to facilitate anchoring the carcass layer 37 of pipe segment tubing 22 therein, the carcass ring 76 of a potted pipe fitting 44 may be made from metal, such as carbon steel, stainless steel, duplex stainless steel, super duplex stainless steel, or any combination thereof. To facilitate anchoring the carcass layer 37 of pipe segment tubing 22 therein, the carcass ring 76 of a potted pipe fitting 44 may be secured to the carcass layer 37. In particular, in some such embodiments, the carcass ring 76 of a potted pipe fitting 44 may be threaded and/or welded onto the outer surface of the carcass layer 37 of a pipe segment 20.

Furthermore, to facilitate anchoring the carcass layer 37 of pipe segment tubing 22 therein, the carcass ring 76 of a potted pipe fitting 44 may be secured (e.g., welded or bonded) to the rest of the potted pipe fitting 44. In particular, as in the depicted example, in some embodiments, the carcass ring 76 may be secured to the fitting connector 46 of the potted pipe fitting 44. In any case, to enable the carcass ring 76 to be secured to pipe segment tubing 22, as in the depicted example, the internal pressure sheath layer 26 of the pipe segment tubing 22 may be cut back to expose a portion of the carcass layer 37 of the pipe segment tubing 22.

However, it should again be appreciated that the depicted example is merely intended to be illustrative. In particular, in other embodiments, the carcass ring 76 of a potted pipe fitting 44 may be secured to the fitting body 48, for example, instead of the fitting connector 46. Alternatively, in other embodiments, a potted pipe fitting 44 may not include a carcass ring 76 and, thus, the internal pressure sheath layer 26 of corresponding pipe segment tubing 22 may not be cut back relative to its carcass layer 37. Additionally, although not depicted, in some embodiments, the fitting connector 46 of a potted pipe fitting 44 may also be secured to the inner fitting body 54 of the potted pipe fitting 44 via one or more threaded fasteners 74. In fact, to facilitate easing securement of a fitting connector 46 of a potted pipe fitting 44 to a corresponding inner fitting body 54, in some embodiments, the outer fitting body 56 of the potted pipe fitting 44 may not overlap with the fitting connector 46.

Figure 6:
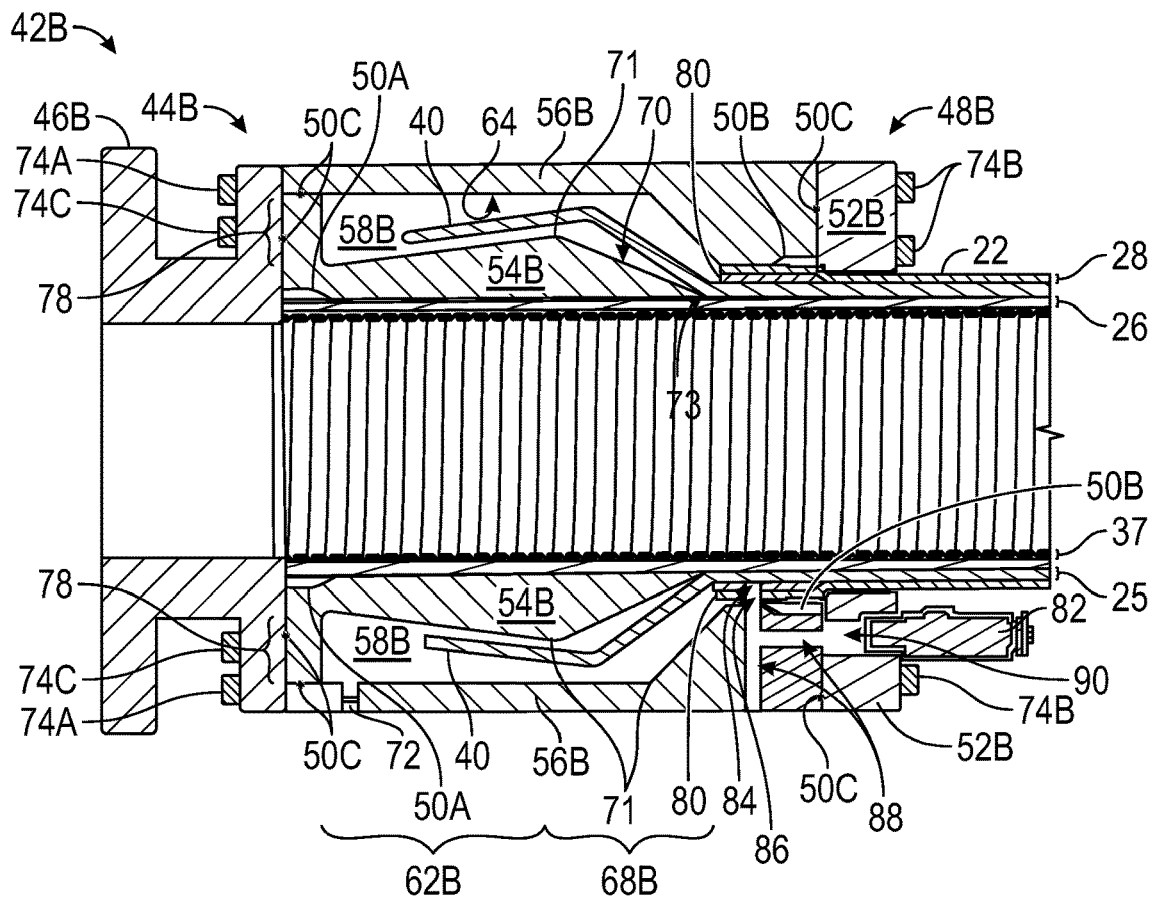
FIG. 6 is an axial cross-section profile of a portion of a pipeline system that includes the pipe segment of FIG. 4 and another example of a potted pipe fitting, in accordance with an embodiment of the present disclosure.

To help illustrate, a portion 42B of a pipeline system 10, which includes another example of a potted pipe fitting 44B and pipe segment tubing 22, is shown in FIG. 6. Similar to the potted pipe fitting 44A of FIG. 5, the potted pipe fitting 44B of FIG. 6 generally includes a fitting connector 46B, a fitting body 48B, threaded fasteners 74, and fitting seals 50—namely an inner seal ring 50A, an outer seal ring 50B, and one or more face seals 50C. In particular, similar to the fitting body 48A of FIG. 5, as depicted in FIG. 6, the fitting body 48B includes a fitting collar 52B, an inner fitting body 54B, which is implemented to be disposed between the internal pressure sheath layer 26 and one or more reinforcement strips 40 of pipe segment tubing 22, and an outer fitting body 56B, which is implemented to be disposed around the one or more reinforcement strips 40 of the pipe segment tubing 22.

However, as depicted in FIG. 6, the outer fitting body 56B of the potted pipe fitting 44B is implemented to overlap with the inner fitting body 54B, but not the fitting connector 46B. In other words, in such embodiments, the potting cavity 58 of a potted pipe fitting 44 may just be defined between the inner surface 64 of its outer fitting body 56 and the outer surface 70 of its inner fitting body 54. In particular, in the depicted example, due to intermediate edges 71 on the inner surface 64 of the outer fitting body 56B and the outer surface 70 of the inner fitting body 54B, the first portion 62B of the potting cavity 58B, which is farther from the outer sheath layer 28 of the pipe segment tubing 22, is defined with a wedge-shaped axial cross-section profile while the second portion 68B of the potting cavity 58B, which is closer to the outer sheath layer 28 of the pipe segment tubing 22, is defined with a different wedge-shaped axial cross-section profile. Moreover, as depicted in FIG. 6, the potting cavity 58B does not overlap with the junction between the inner fitting body 54B and the fitting connector 46B, thereby avoiding the integrity of the potting cavity 58B being dependent on the integrity of the junction between the inner fitting body 54B and the fitting connector 46B.

Nevertheless, similar to FIG. 5, the fitting connector 46B of FIG. 6 is secured to the outer fitting body 56B via first threaded fasteners 74A and the fitting collar 52B is secured to the outer fitting body 56B via second threaded fasteners 74B. However, as depicted in FIG. 6, the fitting connector 46B is additionally secured to the inner fitting body 54B via a third one or more threaded fasteners 74C. In fact, as in the depicted example, to facilitate easing securement of a fitting connector 46 thereto, in some embodiments, a fastener opening in the inner fitting body 54 of a potted pipe fitting 44 may include a lip (e.g., extension) 78 that extends out radially toward the outer fitting body 56 of the potted pipe fitting 44.

However, it should be appreciated that the depicted example is merely intended to be illustrative and not limiting. In particular, in other embodiments, the potted pipe fitting 44B may additionally include a carcass ring 76. Additionally or alternatively, in other embodiments, the inner fitting body 54 of a potted pipe fitting 44 may not include a lip 78. Furthermore, in other embodiments, the fitting connector 46 of a potted pipe fitting 44 may be secured to a corresponding inner fitting body 54 via a single threaded fastener 74 or more than two (e.g., three, four, or more) threaded fasteners 74.

In any case, as depicted in FIG. 6, the inner seal ring 50A of the potted pipe fitting 44A tapers toward the inner fitting body 54B and away from the fitting connector 46B, for example, instead of tapering away from the inner fitting body 54B and toward the fitting connector 46B. Additionally, as depicted in FIG. 6, the potted pipe fitting 44B is implemented such that the reinforcement strips 40 of the pipe segment tubing 22 do not overlap with the inner seal ring 50A. In other words, in such embodiments, a potted pipe fitting 44 may be deployed without disposing its inner seal ring 50A under reinforcement strips 40 of pipe segment tubing 22, thereby obviating having to bend the reinforcement strips 40 out of the way, which, at least in some instances, may potentially weaken the reinforcement strips 40.

Nevertheless, similar to FIG. 5, securing the fitting connector 46B of FIG. 6 to the inner fitting body 54B may activate the inner seal ring 50A at least in part by compressing the inner seal ring 50A between the fitting connector 46B, the inner fitting body 54B, and the internal pressure sheath layer 26 of the pipe segment tubing 22. Additionally, similar to FIG. 5, securing the fitting collar 52B to the outer fitting body 56B may activate an outer seal ring 50B at least in part by compressing the outer seal ring 50B between the fitting collar 52B, the outer fitting body 56B, and the outer sheath layer 28 of the pipe segment tubing 22. Furthermore, as described above, in some embodiments, the outer sheath layer 28 of pipe segment tubing 22 may be implemented using plastic, such as high-density polyethylene (HDPE), which may be relatively easy to deform.

Thus, as in the depicted example, to facilitate separating (e.g., isolating) the sealing function provided by the outer seal ring 50B from the reinforcement function provided by one or more reinforcement strips 40 of pipe segment tubing 22, in some embodiments, a reinforcement sleeve 80 may be inserted and secured between a (e.g., non-cutback) portion of the outer sheath layer 28 and a corresponding portion of the one or more reinforcement strips 40. In particular, in some such embodiments, the reinforcement sleeve 80 may be made from material that has a higher linear elasticity modulus (e.g., stiffness) than solid material that is used to fabricate the outer sheath layer 28 of the pipe segment tubing 22. For example, while the outer sheath layer 28 is made using plastic, the reinforcement sleeve 80 may be implemented at least in part using metal, such as carbon steel, stainless steel, duplex stainless steel, super duplex stainless steel, or any combination thereof.

As described above, to facilitate reducing the likelihood of a weak point developing therein, a potted pipe fitting 44 may reinforce the tubing 22 of a pipe segment 20 starting at least at a point 73 where one or more reinforcement strips 40 of the pipe segment tubing 22 begin flaring away from the internal pressure sheath layer 26 of the pipe segment tubing 22, for example, via its inner fitting body 54 and/or a spacer ring. Since disposed between the outer sheath layer 28 and one or more reinforcement strips 40 of pipe segment tubing 22, a reinforcement sleeve 80 may maintain the one or more reinforcement strips 40 at their target lay angles, thereby enabling the portion of the one or more reinforcement strips 40 disposed under the reinforcement sleeve 80 to continue reinforcing the internal pressure sheath layer 26 of the pipe segment tubing 22. In other words, to facilitate reducing the likelihood of a weak point developing therein, in some embodiments, a potted pipe fitting 44 may reinforce the internal pressure sheath layer 26 of corresponding pipe segment tubing 22 at least up to the beginning of a reinforcement sleeve 80 disposed between the outer sheath layer 28 and one or more reinforcement strips 40 of the pipe segment tubing 22.

In any case, similar to FIG. 5, to enable fluid potting material to be flowed into its potting cavity 58B, the potted pipe fitting 44B of FIG. 6 includes a potting material port 72, which is fluidly connected to the potting cavity 58B. However, as in the depicted example, in some embodiments, a potted pipe fitting 44 may additionally include a vent valve 82, which is fluidly connected to free space (e.g., one or more annular gaps 24) defined within the annulus 25 of pipe segment tubing 22. In particular, in the depicted example, the vent valve 82 is fluidly connected to the annulus 25 of the pipe segment tubing 22 via a first opening 84 formed through the reinforcement sleeve 80, a second opening 86 formed through the outer sheath layer 28 of the pipe segment tubing 22, a first fluid path 88 formed in the outer fitting body 56B, and a second fluid path 90 formed in the fitting collar 52B. In this manner, the vent valve 82 may be used to selectively vent fluid from within the annulus 25 of the pipe segment tubing 22.

However, it should again be appreciated that the depicted example is merely intended to be illustrative and not limiting. In particular, in other embodiments, a potted pipe fitting 44 may not include a vent valve 82 or include more than one (e.g., two, three, or more) vent valves 82. Additionally, in other embodiments, the inner seal ring 50A of a potted pipe fitting 44 may taper away from its inner fitting body 54 and toward its fitting connector 46, for example, instead of tapered toward the inner fitting body 54 and away from the fitting connector 46 (e.g., to block the ingress of fluid from a pipe bore 32 before the fluid reaches a corresponding face seal 50C). Furthermore, in other embodiments, a reinforcement sleeve 80 may not be disposed between the outer sheath layer 28 and one or more reinforcement strips 40 of pipe segment tubing 22. Moreover, as mentioned above, in other embodiments, a potted pipe fitting 44 may include a potting cavity 58 with a continuous uniform axial cross-section profile, for example, to facilitate distributing force more evenly across the potting cavity 58, which at least in some instances, may improve anchoring strength provided by the potted pipe fitting 44.

Figure 7:
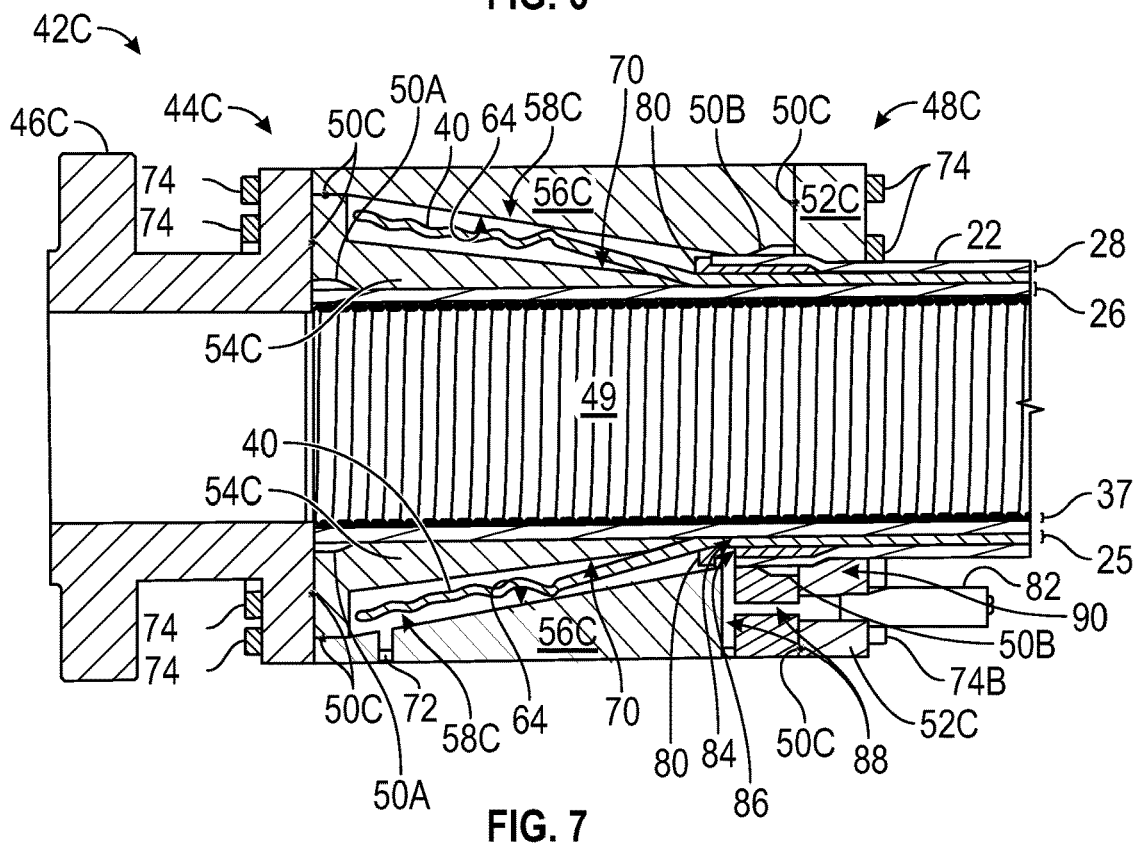
FIG. 7 is an axial cross-section profile of a portion of a pipeline system that includes the pipe segment of FIG. 4 and a further example of a potted pipe fitting, in accordance with an embodiment of the present disclosure.

To help illustrate, a portion 42C of a pipeline system 10, which includes a further example of a potted pipe fitting 44C and pipe segment tubing 22, is shown in FIG. 7. Similar to the potted pipe fitting 44B of FIG. 6, as depicted in FIG. 7, the potted pipe fitting 44C of generally includes a fitting connector 46C, a fitting body 48C, threaded fasteners 74, and fitting seals 50—namely an inner seal ring 50A, an outer seal ring 50B, and one or more face seals 50C. In particular, similar to the fitting body 48B of FIG. 6, the fitting body 48C of FIG. 7 includes a fitting collar 52C, an inner fitting body 54C, which is disposed between the internal pressure sheath layer 26 and one or more reinforcement strips 40 of pipe segment tubing 22, and an outer fitting body 56C, which is disposed around the one or more reinforcement strips 40 of the pipe segment tubing 22. In fact, in some embodiments, the fitting connector 46C of FIG. 7, the fitting collar 52C, the fitting seals 50 of FIG. 7, or any combination thereof may generally match the corresponding components of FIG. 6.

However, as depicted in FIG. 7, the potted pipe fitting 44C may include a potting cavity 58C that has a continuous (e.g., single) uniform wedge-shaped axial cross-section profile, which, at least in some instances, may facilitate improving the strength with which pipe segment tubing 22 can be anchored in the potted pipe fitting 44C. In particular, when force tries to separate pipe segment tubing 22 from the potted pipe fitting 44C after one or more reinforcement strips 40 of the pipe segment tubing 22 are anchored in the potting cavity 58C via cured potting material, the wedge-shaped axial cross-section profile may cause the cured potting material to be compressed against the one or more reinforcement strips 40 and, thus, the cured potting material to increase its grip strength on the one or more reinforcement strips 40. Moreover, the continuous uniform axial cross-section profile of the potting cavity 58C may increase the anchor length within the potted pipe fitting 44C and/or distributing force across the potting cavity 58C more evenly, for example, due to the lack of intermediate edges 71 on the inner surface 64 of the outer fitting body 56C and the outer surface 70 of the inner fitting body 54C reducing the occurrence of stress concentration zones within the potting cavity 58C. In fact, at least in some instances, a continuous uniform axial cross-section profile may enable substantially the whole length of a potting cavity 58 to be concurrently used for anchoring, for example, instead of relying on a second portion 68 of the potting cavity 58 after a failure occurs in a first portion 62 of the potting cavity 58.

To facilitate implementing a potting cavity 58 that has a continuous uniform wedge-shaped axial cross-section profile in a potted pipe fitting 44, as in the depicted example, the outer fitting body 56 of the potted pipe fitting 44 may include a conical inner surface 64 while the inner fitting body 54 of the potted pipe fitting 44 includes a conical outer surface 70. In particular, as in the depicted example, the conical inner surface 64 of the outer fitting body 56 may be slanted at a different angle as compared to the conical outer surface 70 of the inner fitting body 54. For example, the conical inner surface 64 of the outer fitting body 56 may slant at a higher angle while the conical outer surface 70 of the inner fitting body 56 may slant at a lower angle, thereby defining the potting cavity 58 such that it tapers toward the fitting bore 49 of the potted pipe fitting 44.

In any case, similar to FIG. 6, to enable fluid potting material to be flowed into its potting cavity 58C, the potted pipe fitting 44C of FIG. 7 includes a potting material port 72, which is fluidly connected to the potting cavity 58C. Additionally, similar to FIG. 6, to facilitate separating (e.g., isolating) the sealing function provided by the outer seal ring 50B of FIG. 7 from the reinforcement function provided by one or more reinforcement strips 40 of pipe segment tubing 22, a reinforcement sleeve 80 may be inserted and secured between a (e.g., non-cutback) portion of the outer sheath layer 28 of the pipe segment tubing 22 and a corresponding portion of the one or more reinforcement strips 40. In fact, in some embodiments, the reinforcement sleeve 80 of FIG. 7 may generally match the reinforcement sleeve of FIG. 6.

Furthermore, similar to FIG. 6, the potted pipe fitting 44C of FIG. 7 may include a vent valve 82, which is implemented to be fluidly connected to free space (e.g., one or more annular gaps 24) defined within the annulus 25 of pipe segment tubing 22. In particular, in the depicted example, the vent valve 82 is fluidly connected to the annulus 25 of the pipe segment tubing 22 via a first opening 84 formed through the reinforcement sleeve 80, a second opening 86 formed through the outer sheath layer 28 of the pipe segment tubing 22, a first fluid path 88 formed in the outer fitting body 56C, and a second fluid path 90 formed in the fitting collar 52C. In this manner, the vent valve 82 may be used to selectively vent fluid from within the annulus of the pipe segment tubing 22. Moreover, similar to FIG. 6, the potting cavity 58B of FIG. 8 does not overlap with the junction between the inner fitting body 54C and the fitting connector 46C, thereby avoiding the integrity of the potting cavity 58C being dependent on the integrity of the junction between the inner fitting body 54C and the fitting connector 46C.

However, it should be appreciated that the depicted example is merely intended to be illustrative and not limiting. In particular, in other embodiments, the potted pipe fitting 44C may additionally include a carcass ring 76. Additionally or alternatively, in other embodiments, a potted pipe fitting 44 may include a potting cavity 58 that has a differently-shaped continuous uniform axial cross-section profile. Furthermore, in other embodiments, the inner seal ring 50A of a potted pipe fitting 44 may taper away from its inner fitting body 54 and toward its fitting connector 46, for example, instead of tapered toward the inner fitting body 54 and away from the fitting connector 46 (e.g., to block the ingress of fluid from a pipe bore 32 before the fluid reaches a corresponding face seal 50C). In any case, in this manner, a potted pipe fitting 44 may be implemented and/or deployed at pipe segment tubing 22 to facilitate improving the reinforcement the potted pipe fitting 44 provides to the pipe segment tubing 22, which, at least in some instances, may improve pipeline operational efficiency and/or pipeline operational reliability, for example, by reducing the likelihood of fluid pressure within the pipe bore 32 of the pipe segment 20 producing a breach within the potted pipe fitting 44.

Figure 8:
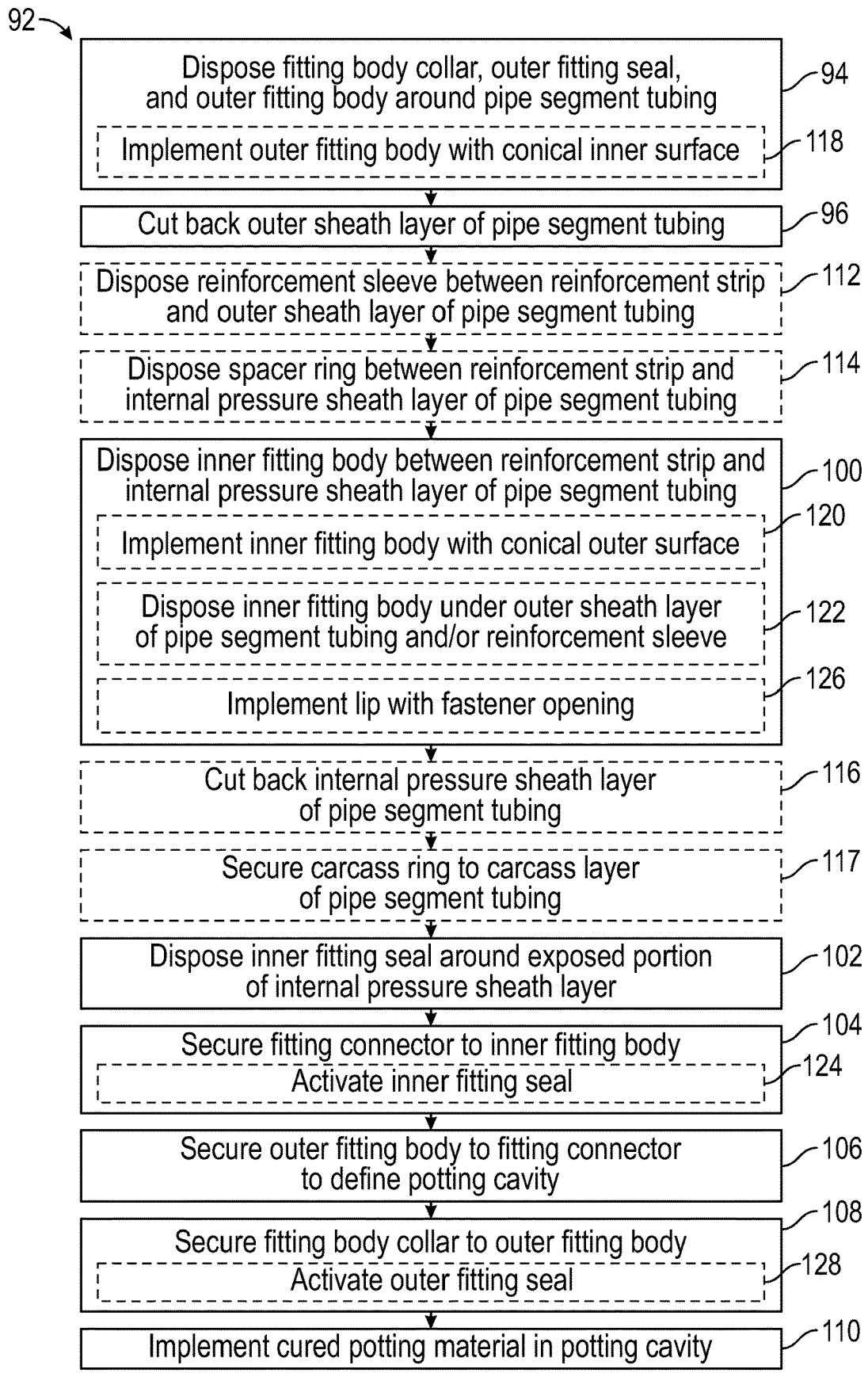
FIG. 8 is a flow diagram of an example of a process for implementing a potted pipe fitting, in accordance with an embodiment of the present disclosure.

To help further illustrate, an example of a process 92 for implementing (e.g., deploying) a potted pipe fitting 44 at pipe segment tubing 22 is described in FIG. 8. Generally, the process 92 includes disposing a fitting collar, an outer seal ring, and an outer fitting body around pipe segment tubing (process block 94), cutting back an outer sheath layer of the pipe segment tubing (process block 96), and disposing an inner fitting body between an internal pressure sheath layer and a reinforcement strip of the pipe segment tubing (process block 100). Additionally, the process 92 generally includes disposing an inner seal ring around an exposed portion of the internal pressure sheath layer (process block 102), securing a fitting connector to the inner fitting body (process block 104), and securing the outer fitting body to the fitting connector to define a potting cavity (process block 106). Furthermore, the process 92 generally includes securing the fitting collar to the outer fitting body (process block 108) and implementing cured potting material within the potting cavity (process block 110).

Although specific process blocks are described in a specific order, which corresponds with an embodiment of the present disclosure, it should be appreciated that the example process 92 is merely intended to be illustrative and non-limiting. In particular, in other embodiments, a process 92 for implementing a potted pipe fitting 44 at pipe segment tubing 22 may include one or more additional blocks and/or omit one or more of the depicted blocks. For example, some embodiments of the process 92 may additionally include disposing a reinforcement sleeve between the reinforcement strip and the outer sheath layer of the pipe segment tubing (process block 112) while other embodiments of the process 92 do not. As another example, some embodiments of the process 92 may additionally include disposing a spacer ring between the reinforcement strip and the internal pressure sheath layer of the pipe segment tubing (process block 114) while other embodiments of the process do not. As a further example, some embodiments of the process 92 may additionally include cutting back the internal pressure sheath layer of the pipe segment tubing (process block 116) while other embodiments of the process do not. As another example, some embodiments of the process 92 may additionally include securing a carcass ring to a carcass layer of the pipe segment tubing (process block 117) while other embodiments of the process 92 do not. Furthermore, in other embodiments, one or more of the depicted blocks may be performed in a different order.

In any case, as described above, to facilitate sealing pipe segment tubing 22 therein, a potted pipe fitting 44 may generally include an outer seal ring 50B. In particular, as described above, the outer seal ring 50B may be compressed between an outer fitting body 56 of the potted pipe fitting 44, a fitting collar 52 of the potted pipe fitting 44, and the outer sheath layer 28 of the pipe segment tubing 22. As such, deploying a potted pipe fitting 44 at pipe segment tubing 22 may include disposing (e.g., sliding) the fitting collar 52, the outer seal ring 50B, and the outer fitting body 56 of the potted pipe fitting 44 around the pipe segment tubing 22 (process block 94).

Additionally, as described above, in some embodiments, the outer fitting body 56 of a potted pipe fitting 44 may include a conical inner surface 64, for example, to implement a potting cavity 58 with a continuous uniform wedge-shaped axial cross-section profile (process block 118). In particular, as described above, a potting cavity 58 of a potted pipe fitting 44 that is defined with a continuous uniform wedge-shaped axial cross-section profile may facilitate distributing force more evenly across the potting cavity 58, which, at least in some instances, may improve anchoring strength provided by the potted pipe fitting 44, for example, due to the continuous uniform wedge-shaped axial cross-section profile reducing the presence of stress concentration zones within the potting cavity 58. Nevertheless, as described above, in other embodiments, the outer fitting body 56 of a potted pipe fitting 44 may have a differently shaped inner surface 64, for example, that includes one or more intermediate edges 71.

In any case, as described above, to facilitate securing pipe segment tubing 22 in a potted pipe fitting 44, a reinforcement strip 40 of the pipe segment tubing 22 may be anchored in the potting cavity 58 of the potted pipe fitting 44. Furthermore, as described above, the outer sheath layer 28 of pipe segment tubing 22 may be disposed around one or more reinforcement strips 40 of the pipe segment tubing 22. Thus, to facilitate securing the pipe segment tubing 22 in the potted pipe fitting 44, the outer sheath layer 28 of the pipe segment tubing 22 may be cut back to expose a portion of one or more reinforcement strips 40 of the pipe segment tubing 22 (process block 96). In some embodiments, to block exposed portions of reinforcement strips 40 from flaring out too far once the outer sheath layer 28 is cut back, a temporary sleeve may be disposed circumferentially around the exposed portions of the reinforcement strips 40. Moreover, as described above, in some embodiments, a reinforcement sleeve 80 may be disposed between a remaining (e.g. non-cutback) portion of the outer sheath layer 28 and a corresponding portion of the one or more reinforcement strips 40, for example, to facilitate separating (e.g., isolating) the sealing function provided by the outer seal ring 50B from the reinforcement function provided by the one or more reinforcement strips 40 (process block 112).

Furthermore, as described above, to facilitate anchoring a reinforcement strip 40 of pipe segment tubing 22 therein, a potted pipe fitting 44 may include an inner fitting body 54, which is disposed between the internal pressure sheath layer 26 and one or more reinforcement strips 40 of the pipe segment tubing 22. As such, implementing a potted pipe fitting 44 at pipe segment tubing 22 may include disposing the inner fitting body 54 of the potted pipe fitting 44 between an exposed portion of the internal pressure sheath layer 26 and one or more reinforcement strips 40 of the pipe segment tubing 22 (process block 100). In particular, as described above, in some embodiments, the inner fitting body 54 of a potted pipe fitting 44 may have a conical outer surface 70, for example, to provide a potting cavity 58 with a continuous uniform wedge-shaped axial cross-section profile (process block 120). Nevertheless, as described above, in other embodiments, the inner fitting body 54 of a potted pipe fitting 44 may have a differently shaped outer surface 70, for example, that includes one or more intermediate edges 71.

In any case, as described above, to facilitate reducing the likelihood of a weak point developing therein, a potted pipe fitting 44 may reinforce the tubing 22 of a pipe segment 20 starting at least at a point 73 where one or more reinforcement strips 40 of the pipe segment 20 begin to flare away from the internal pressure sheath layer 26 of the pipe segment tubing 22. In particular, as described above, in some embodiments, a potted pipe fitting 44 may reinforce the internal pressure sheath layer 26 of pipe segment tubing 22 via its inner fitting body 54. Thus, in such embodiments, disposing an inner fitting body 54 between the internal pressure sheath layer 26 and one or more reinforcement strips 40 of pipe segment tubing 22 may include disposing (e.g., inserting) the inner fitting body 54 under the outer sheath layer 28 of the pipe segment tubing 22 and/or under a reinforcement sleeve 80 that is disposed between the outer sheath layer 28 and the one or more reinforcement strips 40 (process block 122).

However, as described above, in other embodiments, a potted pipe fitting 44 may support the internal pressure sheath layer 26 of pipe segment tubing 22 via a separate spacer ring, which is secured around the internal pressure sheath layer 26 between the inner fitting body 54 of the potted pipe fitting 44 and one or more reinforcement strips 40 of the pipe segment tubing 22. In other words, in such embodiments, implementing a potted pipe fitting 44 at pipe segment tubing 22 may include disposing a spacer ring between the internal pressure sheath layer 26 and one or more reinforcement strips 40 of the pipe segment tubing 22 and inserting the inner fitting body 54 of the potted pipe fitting 44 behind the spacer ring (process block 114). In particular, as described above, in some such embodiments, the spacer ring may be made using different material as compared to the inner fitting body 54, for example, to enable the spacer ring to provide electrical continuity (e.g., and, thus, cathodic protection) to the one or more reinforcement strips.

Additionally, as described above, to facilitate anchoring the carcass layer 37 of pipe segment tubing 22 and/or electrically isolating the carcass layer 37 in a potted pipe fitting 44, in some embodiments, a carcass ring 76 may be secured (e.g., welded or bonded) to the rest of the potted pipe fitting 44 and secured (e.g., welded and/or threaded) to the carcass layer 37 (process block 117). Furthermore, as described above, the internal pressure sheath layer 26 of pipe segment tubing 22 may be disposed around its carcass layer 37. Thus, to facilitate securing a carcass ring 76 to the carcass layer 37 of pipe segment tubing 22, in some such embodiments, the internal pressure sheath layer 26 of the pipe segment tubing 22 may be cut back to expose a portion of the carcass layer 37 (process block 116). Additionally or alternatively, an exposed end of the carcass layer 37 of pipe segment tubing 22 may be welded to itself, for example, to reduce the likelihood of the carcass layer 37 inadvertently unravelling (e.g., unwrapping).

In any case, as described above, to facilitate sealing pipe segment tubing 22 therein, a potted pipe fitting 44 may additionally include an inner seal ring 50A. In particular, as described above, the inner seal ring 50A may be compressed between the inner fitting body 54 of the potted pipe fitting 44, a fitting connector 46 of the potted pipe fitting 44, and the internal pressure sheath layer 26 of the pipe segment tubing 22. As such, implementing a potted pipe fitting 44 at pipe segment tubing 22 may include disposing (e.g., sliding) the inner seal ring 50A of the potted pipe fitting 44 around an exposed portion of the internal pressure sheath layer 26 of the pipe segment tubing 22 (process block 102).

To facilitate securing a potted pipe fitting 44 to another pipeline component (e.g., another potted pipe fitting 44, a bore fluid source 12, or a bore fluid destination 14) in addition to pipe segment tubing 22, a fitting connector 46 may then be secured to the inner fitting body 54 of the potted pipe fitting 44 (process block 104). In particular, as described above, in some embodiments, the fitting connector 46 may be secured to the inner fitting body 54 via one or more threaded fasteners 74, such as a bolt or a screw. In fact, to ease securement of a fitting connector 46 thereto via a threaded fastener 74, in some embodiments, a fastener opening in the inner fitting body 54 of a potted pipe fitting 44 may be implemented on a lip (e.g., extension) 78 that extends out toward a corresponding outer fitting body 56 (process block 126). Additionally, as described above, in some embodiments, securing the fitting connector 46 to the inner fitting body 54 may compress the inner seal ring 50A of the potted pipe fitting 44 between the inner fitting body 54, the fitting connector 46 of the potted pipe fitting 44, and the internal pressure sheath layer 26 of the pipe segment tubing 22, thereby activating the inner seal ring 50A (process block 124). To facilitate compressing the inner seal ring 50A between the fitting connector 46 and the inner fitting body 54, in some embodiments, the inner fitting body 54 may be held in place with a special-purpose installation tool. Furthermore, as described above, in some embodiments, the inner seal ring 50A of a potted pipe fitting 44 may tapers toward its inner fitting body 54 and away from its fitting connector 46 while, in other embodiments, the inner seal ring 50A may taper away from the inner fitting body 54 and toward the fitting connector 46.

The outer fitting body 56 of the potted pipe fitting 44 may then be slid over the exposed portion of the reinforcement strip 40 to define a potting cavity 58 in which one or more reinforcement strips 40 of pipe segment tubing 22 are to be anchored. In other words, since the inner fitting body 54 of the potted pipe fitting 44 is disposed between the internal pressure sheath layer 26 and one or more reinforcement strips 40 of the pipe segment tubing 22, the outer fitting body 56 may be slid around the inner fitting body 54, thereby defining the potting cavity 58 between the inner surface 64 of the outer fitting body 56 and the outer surface 70 of the inner fitting body 54, for example, in addition to between the inner surface 64 of the outer fitting body and the outer surface 66 of a portion 60 of the fitting connector 46. Additionally, as described above, the outer fitting body 56 may have previously been slid around the pipe segment tubing 22 and, thus, the outer fitting body 56 may be disposed around the exposed portion of the reinforcement strip 40 by sliding the outer fitting body 56 in an opposite direction. Furthermore, to facilitate maintaining the potting cavity 58, as described above, in some embodiments, the outer fitting body 56 may be secured to the fitting connector 46 of the potted pipe fitting 44 via one or more threaded fasteners 74, such as a bolt or a screw (process block 106)

The fitting collar 52 of the potted pipe fitting 44 may then be secured to the outer fitting body 56 (process block 108). In particular, as described above, in some embodiments, a fitting collar 52 may be secured to the outer fitting body 56 via one or more threaded fasteners 74, such as a bolt or a screw. In fact, as described above, in some embodiments, securing the fitting collar 52 to the outer fitting body 56 may compress the outer seal ring 50B of the potted pipe fitting 44 between the fitting collar 52, the outer fitting body 56, and the outer sheath layer 28 of the pipe segment tubing 22, thereby activating the outer seal ring 50B (process block 128).

In any case, to facilitate anchoring a reinforcement strip 40 of pipe segment tubing 22 in the potting cavity 58 of a potted pipe fitting 44, as described above, cured potting material may be implemented in the potting cavity 58 (process block 110). In particular, to implement cured potting material in the potting cavity 58, as described above, fluid (e.g., liquid) potting material, such as epoxy, may be flowed (e.g., filled) into the potting cavity 58, for example, via a potting material port 72 of the potted pipe fitting 44. After curing (e.g., hardening and/or solidifying), a solid mass of cured potting material may encase the portion of the one or more reinforcement strips 40 in the potting cavity 58. More specifically, the cured potting material may bond to the portion of the one or more reinforcement strips 40 in the potting cavity 58 and, thus, facilitate anchoring the one or more reinforcement strips 40 in the potting cavity 58. In this manner, the present disclosure provides techniques for implementing and/or deploying a potted pipe fitting to facilitate improving the reinforcement the potted pipe fitting provides to the tubing of a corresponding pipe segment, which, at least in some instances, may improve pipeline operational efficiency and/or pipeline operational reliability, for example, by reducing the likelihood of fluid pressure within the pipe bore of the pipe segment producing a breach within the pipe fitting.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipeline system comprising:
a pipe segment, wherein the pipe segment comprises tubing having:
an internal pressure sheath layer that defines a pipe bore;
a reinforcement strip implemented around the internal pressure sheath layer to define a fluid conduit within a tubing annulus of the pipe segment; and
an outer sheath layer implemented around the reinforcement strip; and
a potted pipe fitting, wherein the potted pipe fitting comprises:
an outer fitting body disposed around a portion of the reinforcement strip in the pipe segment;
an inner fitting body disposed between the portion of the reinforcement strip and the internal pressure sheath layer of the pipe segment, wherein:
the inner fitting body directly abuts the internal pressure sheath layer at least up to a point where the reinforcement strip begins to flare away from the internal pressure sheath layer; and
a potting cavity of the potted pipe fitting is defined at least between an inner surface of the outer fitting body and an outer surface of the inner fitting body;
cured potting material implemented around the portion of the reinforcement strip in the potting cavity to secure the potted pipe fitting to the pipe segment;
a reinforcement sleeve disposed between a remaining portion of the outer sheath layer of the pipe segment and a corresponding portion of the reinforcement strip of the pipe segment, wherein:
the outer sheath layer of the pipe segment is cutback to expose the portion of the reinforcement strip; and
the inner fitting body of the potted pipe fitting is partially disposed under the reinforcement sleeve;
a fitting collar secured to the outer fitting body of the potted pipe fitting; and
a vent valve fluidly connected to the fluid conduit defined in the tubing annulus of the pipe segment via a first opening formed through the reinforcement sleeve, a second opening formed through the outer sheath layer of the pipe segment, a first fluid path formed through the outer fitting body of the potted pipe fitting, and a second fluid path formed through the fitting collar of the potted pipe fitting.

2. The pipeline system of claim 1, wherein:
the tubing of the pipe segment comprises a carcass layer implemented within the internal pressure sheath layer of the pipe segment; and
the potted pipe fitting comprises a carcass ring secured to an outer surface of the carcass layer of the pipe segment to facilitate anchoring the carcass layer in the potted pipe fitting, electrically isolating the carcass layer in the potted pipe fitting, or both.

3. The pipeline system of claim 1, wherein the potted pipe fitting comprises:
a fitting connector secured to the outer fitting body and the inner fitting body of the potted pipe fitting, wherein the fitting connector is configured to enable the potted pipe fitting to be connected to another pipeline component in the pipeline system;
an inner seal ring compressed between the fitting connector, the inner fitting body, and the internal pressure sheath layer of the pipe segment;
a fitting collar secured to the outer fitting body of the potted pipe fitting; and
an outer seal ring compressed between the outer fitting body, the fitting collar, and the outer sheath layer of the pipe segment.

4. The pipeline system of claim 3, wherein the outer fitting body of the potted pipe fitting does not overlap with the fitting connector of the potted pipe fitting.

5. The pipeline system of claim 1, wherein:
the outer sheath layer of the pipe segment is cutback to expose the portion of the reinforcement strip; and
the inner fitting body of the potted pipe fitting is partially disposed under a remaining portion of the outer sheath layer of the pipe segment.

6. The pipeline system of claim 1, wherein:
the outer fitting body of the potted pipe fitting comprises a conical inner surface; and
the inner fitting body of the potted pipe fitting comprises a conical outer surface.

7. The pipeline system of claim 1, wherein the potting cavity of the potted pipe fitting is defined with a continuous uniform wedge-shaped axial cross-section profile that tapers continuously and uniformly from a closed end of the potting cavity to an open end of the potting cavity to improve anchoring strength provided by the potted pipe fitting.

8. A pipe fitting comprising:
an outer fitting body having a conical inner surface, wherein the outer fitting body is configured to be disposed around an exposed portion of a reinforcement strip in pipe segment tubing;
an inner fitting body having a conical outer surface, wherein the inner fitting body is configured to be disposed between the exposed portion of the reinforcement strip and an internal pressure sheath layer of the pipe segment tubing;
a fitting connector configured to enable the pipe fitting to be connected to another pipeline component, wherein the outer fitting body and the inner fitting body are configured to be secured to the fitting connector to define a potting cavity between the conical inner surface of the outer fitting body and the conical outer surface of the inner fitting body such that the potting cavity has a continuous uniform wedge-shaped axial cross-section profile that tapers continuously and uniformly from a closed end of the potting cavity to an open end of the potting cavity, wherein the exposed portion of the reinforcement strip is to be anchored in the potting cavity via cured potting material;
a fitting collar configured to be secured to the outer fitting body; and
a vent valve configured to be fluidly connected to a fluid conduit defined by the reinforcement strip in a tubing annulus of the pipe segment tubing via an opening formed through an outer sheath layer of the pipe segment tubing, a first fluid path formed through the outer fitting body, and a second fluid path formed through the fitting collar.

9. The pipe fitting of claim 8, wherein the inner fitting body is configured to directly abut the internal pressure sheath layer of the pipe segment tubing at least up to a point where the reinforcement strip of the pipe segment tubing begins flaring away from the internal pressure sheath layer of the pipe segment tubing.

10. The pipe fitting of claim 8, comprising a threaded fastener configured to be used to secure the fitting connector to the inner fitting body, wherein the inner fitting body comprises a fastener opening formed on a lip that extends out radially toward the outer fitting body.

11. The pipe fitting of claim 8, wherein comprising a potting material port formed through the outer fitting body of the pipe fitting to enable fluid potting material to be flowed into the potting cavity of the pipe fitting.

12. A pipeline system comprising:
   a pipe segment, wherein the pipe segment comprises tubing having:
      an internal pressure sheath layer that defines a pipe bore;
      a reinforcement strip implemented around the internal pressure sheath layer to define a fluid conduit within a tubing annulus of the pipe segment; and
      an outer sheath layer implemented around the reinforcement strip; and
   a potted pipe fitting, wherein the potted pipe fitting comprises:
      an outer fitting body disposed around a portion of the reinforcement strip in the pipe segment;
      an inner fitting body disposed between the portion of the reinforcement strip and the internal pressure sheath layer of the pipe segment, wherein:
         the inner fitting body directly abuts the internal pressure sheath layer at least up to a point where the reinforcement strip begins to flare away from the internal pressure sheath layer; and
         a potting cavity of the potted pipe fitting is defined at least between an inner surface of the outer fitting body and an outer surface of the inner fitting body; and
      cured potting material implemented around the portion of the reinforcement strip in the potting cavity to secure the potted pipe fitting to the pipe segment;
      a fitting collar secured to the outer fitting body of the potted pipe fitting; and
      a vent valve fluidly connected to the fluid conduit defined in the tubing annulus of the pipe segment via an opening formed through the outer sheath layer of the pipe segment, a first fluid path formed through the outer fitting body of the potted pipe fitting, and a second fluid path formed through the fitting collar of the potted pipe fitting.

13. The pipeline system of claim 12, wherein the potted pipe fitting comprises:
   a fitting connector secured to the outer fitting body and the inner fitting body of the potted pipe fitting, wherein:
      the fitting connector is configured to enable the potted pipe fitting to be connected to another pipeline component in the pipeline system; and
      the outer fitting body of the potted pipe fitting does not overlap with the fitting connector of the potted pipe fitting;
   an inner seal ring compressed between the fitting connector, the inner fitting body, and the internal pressure sheath layer of the pipe segment; and
   an outer seal ring compressed between the outer fitting body, the fitting collar, and the outer sheath layer of the pipe segment.

14. The pipeline system of claim 12, wherein:
   the outer sheath layer of the pipe segment is cutback to expose the portion of the reinforcement strip; and
   the inner fitting body of the potted pipe fitting is partially disposed under a remaining portion of the outer sheath layer of the pipe segment.

15. The pipeline system of claim 12, wherein:
   the outer fitting body of the potted pipe fitting comprises a conical inner surface; and
   the inner fitting body of the potted pipe fitting comprises a conical outer surface.

16. The pipeline system of claim 12, wherein the potting cavity of the potted pipe fitting is defined with a continuous uniform wedge-shaped axial cross-section profile that tapers continuously and uniformly from a closed end of the potting cavity to an open end of the potting cavity to improve anchoring strength provided by the potted pipe fitting.

\* \* \* \* \*